United States Patent
Lim et al.

(12) 
(10) Patent No.: US 11,528,352 B1
(45) Date of Patent: Dec. 13, 2022

(54) HINGED ELECTRONIC DEVICE WITH DISPLACEMENT ALTERING HINGE AND CORRESPONDING SYSTEMS

(71) Applicant: Motorola Mobility LLC, Chicago, IL (US)

(72) Inventors: Yong-Ho Lim, Kildeer, IL (US); Alberto R. Cavallaro, Northbrook, IL (US); Thomas Gitzinger, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/490,640

(22) Filed: Sep. 30, 2021

(51) Int. Cl.
 *H04M 1/02* (2006.01)
(52) U.S. Cl.
 CPC ......... *H04M 1/022* (2013.01); *H04M 1/0268* (2013.01)
(58) Field of Classification Search
 CPC .. H04M 1/0214; H04M 1/0216; H04M 1/022; H04M 1/0237; H04M 1/0268
 See application file for complete search history.

(56) References Cited

U.S. PATENT DOCUMENTS

| | | | |
|---|---|---|---|
| 7,797,795 B2 * | 9/2010 | Maatta | G06F 1/1616 16/358 |
| 9,848,502 B1 | 12/2017 | Chu | |
| 10,601,967 B1 | 3/2020 | Harmon et al. | |
| 10,782,739 B2 * | 9/2020 | Ou | H04M 1/0268 |
| 2020/0166974 A1 * | 5/2020 | Ai | G06F 1/1681 |
| 2021/0011513 A1 | 1/2021 | Watamura et al. | |

FOREIGN PATENT DOCUMENTS

KR 20220027710 3/2022

OTHER PUBLICATIONS

Lim, et al., "Hinged Electronic Device with Displacement Altering Hinge and Corresponding Systems", Specification and Drawings as Filed Sep. 11, 2020 for MM920200018-US-NP; Not yet published; U.S. Appl. No. 17/018,932.
Perez, Angelica, "NonFinal Office Action", U.S. Appl. No. 17/490,624, filed Sep. 30, 2021; dated Jul. 26, 2022.

* cited by examiner

*Primary Examiner* — Nhan T Le
(74) *Attorney, Agent, or Firm* — Philip H. Burrus, IV

(57) ABSTRACT

A hinge housing of an electronic device is coupled to a first hinge arm extending into to a first device housing a second hinge arm extending into a second device housing. The first hinge arm has a first pin extending from a terminal edge of the first hinge arm that engages a first slot defined by a first plate fixedly coupled to the first device housing. The second hinge arm has a second pin extending from a terminal edge of the second hinge arm that engages a second slot defined by a second plate fixedly coupled to the second device housing. The pins translate when the first device housing and the second device housing pivot to change a displacement between the hinge housing and the device housings, as well as to separate proximal ends of the first device housing and the second device housing in the closed position.

20 Claims, 12 Drawing Sheets

HINGED ELECTRONIC DEVICE WITH DISPLACEMENT ALTERING HINGE AND CORRESPONDING SYSTEMS

BACKGROUND

Technical Field

This disclosure relates generally to electronic devices, and more particularly to hinged electronic devices.

Background Art

Portable electronic communication devices, especially smartphones, have become ubiquitous. People all over the world use such devices to stay connected. These devices have been designed in various mechanical configurations. A first configuration, known as a "candy bar," is generally rectangular in shape, has a rigid form factor, and has a display disposed along a major face of the electronic device. By contrast, a "clamshell" device has a mechanical hinge that allows one housing to pivot relative to the other.

Some consumers prefer candy bar devices, while others prefer clamshell devices. To satisfy the latter, it would thus be desirable to have an improved hinged electronic device.

Figure 1:
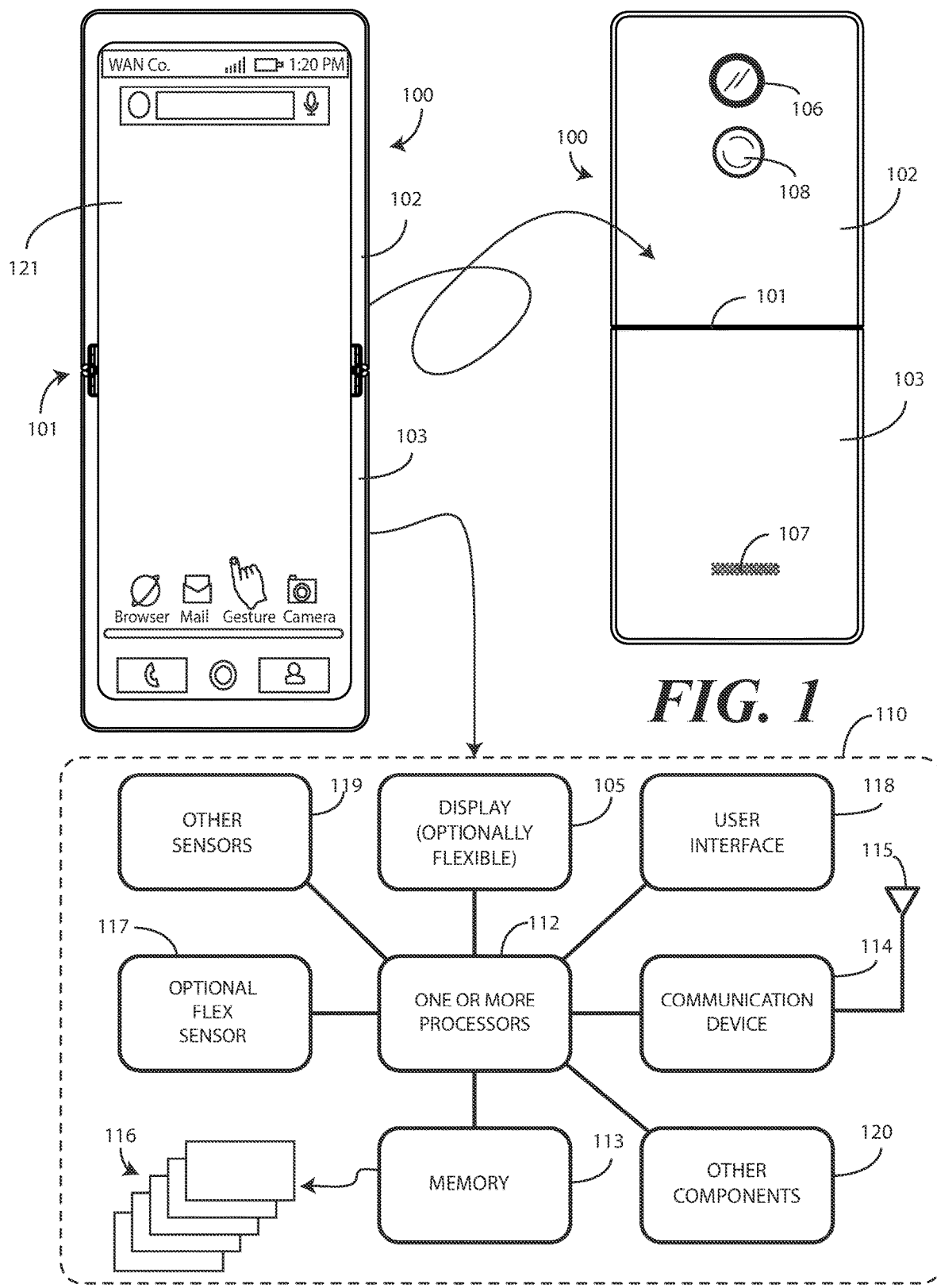
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path.

The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that includes at least a first device housing and a second device housing. In one or more embodiments, a hinge assembly couples the first device housing to the second device housing so that the first device housing is pivotable about a hinge mechanism of the hinge assembly relative to the second device housing to one or more of a bent configuration, a folded configuration, or other configuration.

In one or more embodiments, a flexible display is coupled to the first device housing and the second device housing. The flexible display then spans the hinge assembly. The flexible display deforms when the first device housing pivots about the hinge assembly relative to the second device housing.

In other embodiments, the first device housing and the second device housing each have coupled thereto a separate display, which may be rigid or flexible. For example, a first display may be coupled to the first device housing on one side of the hinge assembly, while a second display is coupled to the second device housing on a second side of the hinge assembly.

In one or more embodiments, the hinge of the hinge assembly not only facilitates the bending operation, but also works to improve the reliability and usability of the flexible display. In one or more embodiments, the hinge assembly does this via the use of plates coupled to the first device housing and the second device housing that, when operating in conjunction with a first linking arm and a second linking arm, cause proximal ends of the first device housing and the second device housing coupled to the hinge housing separate a greater distance apart than do distal ends of the first device housing and the second device housing, with "proximal" and "distal" referring to relationships to the hinge assembly.

The hinge assembly and its corresponding plates serve two functions. First, they provide mechanical support for the flexible display when the first device housing has pivoted about the hinge assembly relative to the second device housing to an axially displaced open position. However, when the first device housing pivots about the hinge assembly relative to the second device housing to a closed position, where interior surfaces of the first device housing and the second device housing abut, the action of the linking arms working in the hinge mechanism causes proximal ends of the first device housing and the second device housing coupled to the hinge housing separate.

This separation of the distal ends of the first plate of the hinge mechanism and the second plate of the hinge mechanism creates a void between the proximal ends of the first device housing and the second device housing in the hinge region of the electronic device that allows the flexible display to form a service loop when the electronic device is in the closed position. The service loop prevents the flexible display from being damaged or developing memory in the folded position when the electronic device is in the closed position.

Embodiments of the disclosure contemplate that bending operations occurring in a housing of an electronic device with a flexible display can present technical challenges. Illustrating by example, it can be difficult to provide uniform mechanical support beneath the flexible display when the electronic device is in the axially displaced open position. It can further be difficult to limit deformation due to bending operations such that the deformation occurs within a predefined radius.

Advantageously, embodiments of the disclosure provide solutions to each one of these challenges. Specifically hinges configured in accordance with one or more embodiments of the disclosure provide a solution that provides the needed system flexibility by providing support for the flexible display when in the open position, but that still allows for a service loop of the flexible display to occur when the electronic device is in the closed position.

In one or more embodiments, the flexible display is positioned within a linear recess of the first device housing and the second device housing so that it—or a fascia disposed atop the flexible display—can be flush with the interior surfaces of the first device housing and second device housing, respectively. In other embodiments, the linear recess will be omitted, and the flexible display will simply sit atop planar interior surfaces of the first device housing and the second device housing.

In either embodiment, when the first device housing pivots about the hinge assembly relative to the second device housing to the axially displaced, open position, the first plate of the hinge assembly, the hinge housing, and the second plate of the hinge assembly bridge the linear recess (or planar interior surfaces) to provide mechanical support for the flexible display. By contrast, a first linking arm and a second linking arm of the hinge assembly then cause the proximal ends of the first plate of the hinge assembly and the second plate of the hinge assembly, and therefore the proximal ends of the first device housing and the second device housing coupled to the hinge housing, separate by a predefined distance when the first device housing pivots about the hinge assembly relative to the second device housing to the closed position. In so doing, the first plate of the hinge assembly and the second plate of the hinge assembly define boundaries within which the flexible display defines a service loop when the first device housing and the second device housing pivot about the hinge assembly from the axially displaced open position to a closed position.

Embodiments of the disclosure thus provide a novel hinge mechanism that properly supports a flexible display when a hinged electronic device is in the open position. Embodiments of the disclosure contemplate that the mechanical stack of the flexible display is frequently too soft or flexible to support itself. Accordingly, when the electronic device is in the axially displaced open position the plates of the hinge assembly, which are rigidly coupled to the first device housing and second device housing in one or more embodiments, provide rigid support mechanisms across the hinge portion of the electronic device. At the same time, the hinge arms cause these two plates to physically separate when the electronic device is in the closed position to allow the flexible display to form a service loop. Advantageously, the hinge assembly and corresponding mechanical plates coupled to the device housings, combined with the operation of the linking arms, define kinematic linkages that move when the first device housing pivots about the hinge assembly relative to the second device housing to the closed position. The plates and a support surface of a hinge housing define a planar support surface when the electronic device is in the axially displaced open position, with those plates separating to define boundaries for a service loop of the flexible display in the closed position.

Embodiments of the disclosure contemplate that when the flexible display is fixedly coupled to the first device housing and also fixedly coupled to the second device housing, with the first device housing, hinge, and second device housing configured to cause the flexible display to extend and become substantially planar when the first device housing and second device housing are in the axially displaced open position, the path length of the mechanical mechanism defined by the first support plate, the second support plate, and the hinge housing can be different than the path length of the flexible display when each is in the closed position. Said differently, for an electronic device configured to extend a flexible display flat when in the axially displaced open position, when the electronic device is in the closed position, the length of the service loop defined by the flexible display and the mechanical boundaries defined by the first support plate, hinge housing, and second support plate may be different.

In particular, to provide sufficient room for the service loop, the mechanical mechanism defined by the first plate of the hinge mechanism, the hinge housing, and the second plate of the hinge mechanism may be longer than the length of display that bends to define the service loop. This difference in length can be problematic in that it can result in either deformations in the service loop when the electronic device is in the closed position, or alternatively mechanical strain or unevenness in the flexible display when the electronic device is in the axially displaced open position.

While a spring-loaded plate can be used to apply tension to one end of the flexible display to compensate for the distance differential, this can cause the flexible display to "feel" like its moving when a user is delivering user input to the flexible display. Advantageously, embodiments of the disclosure provide an improved hinge mechanism that eliminates the need for any spring-loaded plate.

Hinges configured in accordance with embodiments of the disclosure allow for the flexible display to be fixedly connected to the first device housing and second device housing, respectively, and to fully extend when the electronic device is in the axially displaced open position, yet form a proper service loop when the electronic device is in the closed position.

Embodiments of the disclosure accomplish this by employing a hinge mechanism that changes a displacement between a hinge housing and the first device housing and second device housing, respectively, as the first device housing and second device housing pivot about the hinge assembly between the axially displaced open position and the closed position. Effectively, hinges configured in accordance with embodiments of the disclosure cause the hinge housing of the hinge assembly to get closer to the first device housing and second device housing, respectively, when the electronic device is in the axially displaced open position, and farther from the hinge housing when the electronic device is in the closed position. This changing distance compensates for the difference between the bending length of the flexible display and the length of the mechanical mechanism supporting the flexible display.

In one or more embodiments, a hinge housing is coupled to a first hinge arm and a second hinge arm. In one or more embodiments, the first hinge arm extends into the first device housing. The first hinge arm comprises a pin extending from a terminal edge of the first hinge arm. In one or more embodiments, the pin engages a first slot defined by a first plate that is fixedly coupled to the first device housing.

In a similar fashion, second hinge arm extends into the second device housing and comprises a pin extending from a terminal edge of the second hinge arm. In one or more embodiments, the pin engages a second slot defined by a second plate fixedly coupled to the second device housing.

In one or more embodiments, a first plate and a second plate define the first slot and second slot, respectively, with the first plate and the second plate being fixedly coupled to the first device housing and the second device housing, respectively, by a fastener, screw, or other attachment device. By having the first plate and the second plate define the first slot and the second slot (and a corresponding third slot and fourth slot on the opposite side of each plate), these plates can be configured as part of the hinge assembly, thereby allowing the entire hinge assembly to be attached to the first device housing and the second device housing during manufacture. In other embodiments, the first slot and second slot could be defined by the first device housing and second device housing, respectively, or could be defined by other elements that are coupled to the first device housing and second device housing. Still other embodiments will be obvious to those of ordinary skill in the art having the benefit of this disclosure.

In one or more embodiments, the first plate and second plate serve as a "fixed" arm for the hinge assembly in that they are fixedly coupled to the first device housing and second device housing, respectively. By contrast, the first hinge arm and the second hinge arm of the hinge assembly function as a "sliding" arm for the hinge assembly due to the fact that the pins translate within translation portions of the first slot and the second slot when the first device housing and the second device housing pivot between the closed position and the axially displaced open position.

Accordingly, in one or more embodiments, the first pin translates within the first slot and the second pin translates within the second slot, respectively, when the first device housing and the second device housing pivot about the hinge housing between the axially displaced open position and the closed position, thereby changing the displacement between the hinge housing and the first device housing and the second device housing. In one or more embodiments, this displacement is shorter when the first device housing and the second device housing are pivoted about the hinge housing to the axially displaced open position than when the first device housing and the second device housing are pivoted about the hinge housing to the closed position.

It is the translation of the first pin within the first slot and the second pin within the second slot that occurs when the hinge pivots that changes the displacement between the hinge housing and the first device housing and the second device housing. Effectively, the first hinge arm and the second hinge arm translate into the first device housing and the second device housing, respectively, when the first device housing and the second device housing pivot to the axially displaced open position. By contrast, the first hinge arm and the second hinge arm translate out of the first device housing and second device housing when the first device housing and second device housing pivot to the closed position.

In one or more embodiments, this allows an interior face of the hinge housing to be positioned farther from the first device housing and the second device housing, respectively, when the first device housing is pivoted about the hinge housing relative to the second device housing to the closed position than when the first device housing is pivoted about the hinge housing relative to the second device housing to the axially displaced open position.

This change in displacement advantageously compensates for the distance in the bending length of the flexible display and the length of the mechanical support. This also eliminates the need for any spring-loaded plate or other tensioning mechanism to be included. Moreover, it allows ends of the flexible display to be fixedly coupled to the first device housing and second device housing, respectively, thereby providing a more rigid and stable feel for users interacting with the flexible display using touch input. Other advantages of embodiments of the disclosure will be explained below. Still others will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a first device housing 102 and a second device housing 103. In one or more embodiments, a hinge assembly 101 couples the first device housing 102 to the second device housing 103. In one or more embodiments, the first device housing 102 is selectively pivotable about the hinge assembly 101 relative to the second device housing 103. For example, in one or more embodiments the first device housing 102 is selectively pivotable about the hinge assembly 101 between a closed position, shown and described below with reference to FIG. 2, and an axially displaced open position, shown and described below with reference to FIGS. 4-5.

In one or more embodiments the first device housing 102 and the second device housing 103 are manufactured from a rigid material such as a rigid thermoplastic, metal, or composite material, although other materials can be used. Still other constructs will be obvious to those of ordinary skill in the art having the benefit of this disclosure. In the illustrative embodiment of FIG. 1, the electronic device 100 includes a single hinge assembly. However, in other embodiments two or more hinges can be incorporated into the electronic device 100 to allow it to be folded in multiple locations.

This illustrative electronic device 100 of FIG. 1 includes a display 105. The display 105 can optionally be touch-sensitive. In one embodiment where the display 105 is touch-sensitive, the display 105 can serve as a primary user interface 118 of the electronic device 100. Users can deliver user input to the display 105 of such an embodiment by delivering touch input from a finger, stylus, or other objects disposed proximately with the display 105.

In one embodiment, the display 105 is configured as an organic light emitting diode (OLED) display fabricated on a flexible plastic substrate, thereby making the display 105 a flexible display 121. This allows the display 105 to be flexible so as to deform when the first device housing 102 pivots about the hinge assembly 101 relative to the second device housing 103. However, it should be noted that other types of displays suitable for use with the electronic device 100 will be obvious to those of ordinary skill in the art having the benefit of this disclosure. Illustrating by example, as will be described in more detail with reference to FIG. 27 below, in other embodiments multiple displays can be used. For instance, a first rigid display can be coupled to the first device housing 102, while a second, separate rigid display can be coupled to the second device housing 103, with the hinge assembly 101 separating the two displays.

Where a flexible display 121 is used, in one or more embodiments an OLED is constructed on flexible plastic substrates can allow the flexible display 121 to bend with various bending radii. For example, some embodiments allow bending radii of between thirty and six hundred millimeters. Other substrates allow bending radii of around five millimeters to provide a display that is foldable through active bending.

In one or more embodiments the flexible display 121 may be formed from multiple layers of flexible material such as flexible sheets of polymer or other materials. In this illustrative embodiment, the flexible display 121 is fixedly coupled to the first device housing 102 and the second device housing 103. The flexible display 121 spans the hinge assembly 101 in this illustrative embodiment.

Features can be incorporated into the first device housing 102 and/or the second device housing 103. Examples of such features include a camera 106 or an optional speaker port 107, which are shown disposed on the rear side of the electronic device 100 in this embodiment but could be placed on the front side as well.

In this illustrative embodiment, a user interface component 108, which may be a button or touch sensitive surface, can also be disposed along the rear side of the first device housing 102. As noted, any of these features are shown being disposed on the rear side of the electronic device 100 in this embodiment, but could be located elsewhere, such as on the front side in other embodiments. In other embodiments, these features may be omitted.

A block diagram schematic 110 of the electronic device 100 is also shown in FIG. 1. The block diagram schematic 110 can be configured as a printed circuit board assembly disposed within either or both of the first device housing 102 or the second device housing 103 of the electronic device 100. Various components can be electrically coupled together by conductors or a bus disposed along one or more printed circuit boards.

For example, some components of the block diagram schematic 110 can be configured as a first electronic circuit fixedly situated within the first device housing 102, while other components of the block diagram schematic 110 can be configured as a second electronic circuit fixedly situated within the second device housing 103. A flexible substrate can then span the hinge assembly 101 to electrically couple the first electronic circuit to the second electronic circuit.

In one or more embodiments, the electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 113, can optionally store the executable software code used by the one or more processors 112 during operation.

In this illustrative embodiment, the electronic device 100 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications such as HomeRF, Bluetooth and IEEE 802.11, and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the electronic device 100. For example, in one embodiment the one or more processors 112 comprise one or more circuits operable with one or more user interface devices, which can include the display 105, to present, images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

Figure 2:
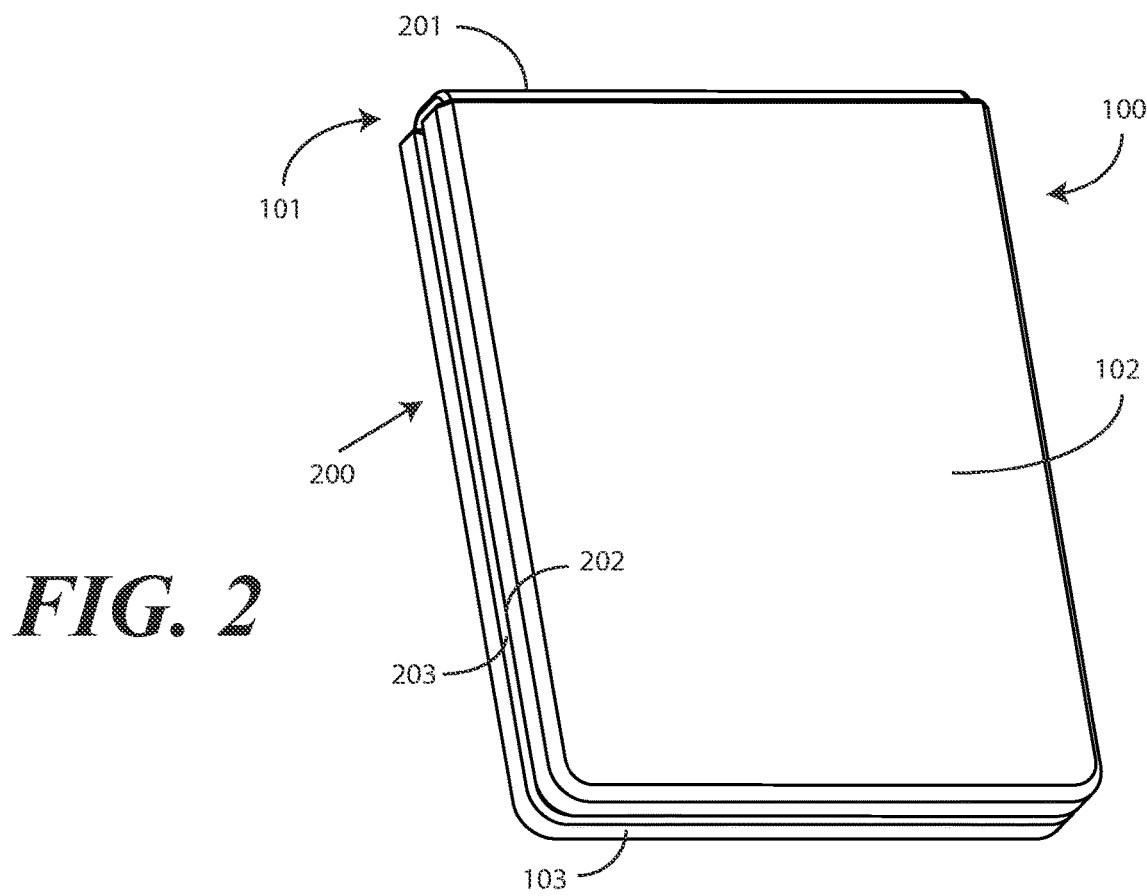
FIG. 2 illustrates a perspective view of one explanatory electronic device in accordance with one or more embodiments of the disclosure in a closed position.
Figure 3:
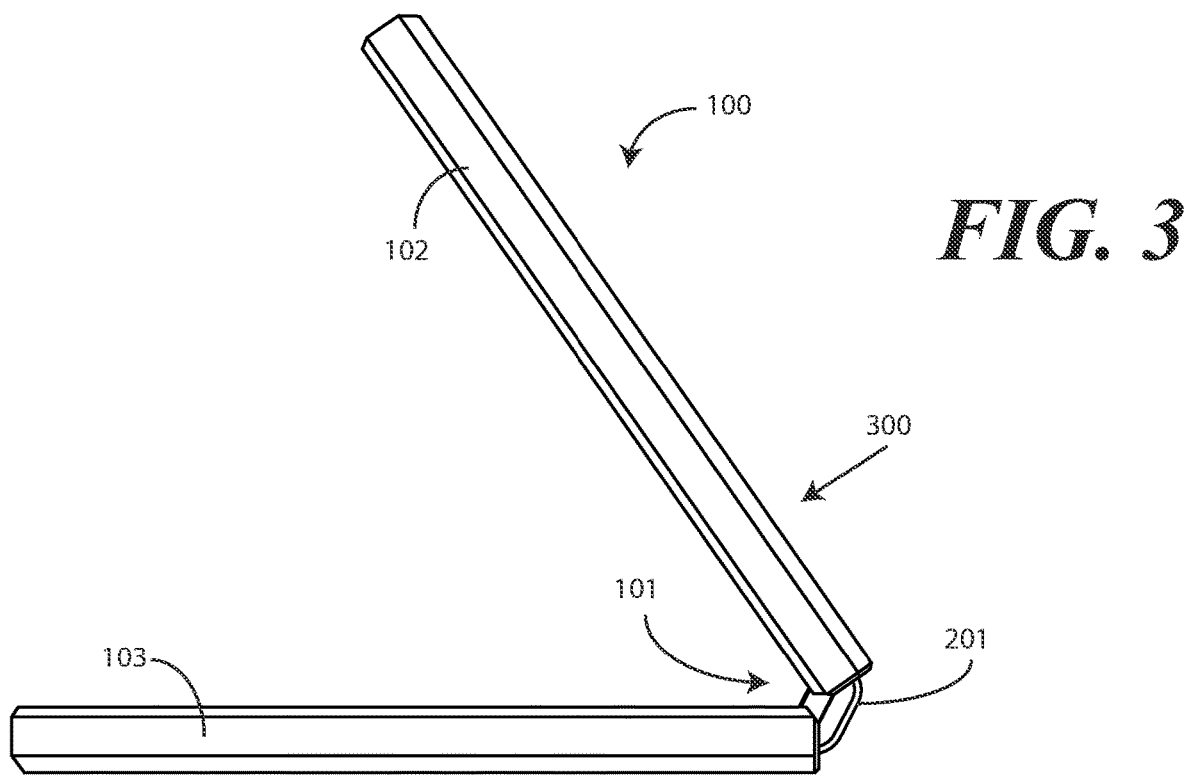
FIG. 3 illustrates a side elevation view of one explanatory electronic device in accordance with one or more embodiments of the disclosure in a partially open position.

In one embodiment, the electronic device 100 optionally includes one or more flex sensors 117, operable with the one or more processors 112, to detect a bending operation that causes the first device housing 102 to pivot about the hinge assembly 101 relative to the second device housing 103, thereby transforming the electronic device 100 into a deformed geometry, such as that shown in FIGS. 2-3. The inclusion of flex sensors 117 is optional, and in some embodiment flex sensors 117 will not be included.

In one embodiment, the one or more processors 112 may generate commands or execute control operations based on information received from the various sensors, including the one or more flex sensors 117, the user interface 118, or the other sensors 119. The one or more processors 112 may also generate commands or execute control operations based upon information received from a combination of the one or more flex sensors 117, the user interface 118, or the other sensors 119. Alternatively, the one or more processors 112 can generate commands or execute control operations based upon information received from the one or more flex sensors 117 or the user interface 118 alone. Moreover, the one or more processors 112 may process the received information alone or in combination with other data, such as the information stored in the memory 113.

The one or more other sensors 119 may include a microphone, an earpiece speaker, a second loudspeaker (disposed beneath speaker port 107), and a user interface component such as a button or touch-sensitive surface. The one or more other sensors 119 may also include key selection sensors, proximity sensors, a touch pad sensor, a touch screen sensor, a capacitive touch sensor, and one or more switches. Touch sensors may used to indicate whether any of the user actuation targets present on the display 105 are being actuated. Alternatively, touch sensors disposed in the electronic device 100 can be used to determine whether the electronic device 100 is being touched at side edges or major faces of the first device housing 102 or the second device housing 103. The touch sensors can include surface and/or housing capacitive sensors in one embodiment. The other sensors 119 can also include audio sensors and video sensors (such as a camera).

The other sensors 119 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope can be used in a similar fashion.

Other components 120 operable with the one or more processors 112 can include output components such as video outputs, audio outputs, and/or mechanical outputs. Examples of output components include audio outputs such as speaker port 107, earpiece speaker, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure. Illustrating by example, the electronic device 100 of FIG. 1 includes a single flexible display 121. By contrast, another embodiment shown below in FIG. 27 includes two separate and distinct displays, and so forth. Additionally, as will be described in more detail below, some embodiments include support plates that are pivotally coupled to a hinge housing of the hinge assembly 101. In other embodiments, these support plates will be omitted.

Turning now to FIG. 2, illustrated therein is the electronic device 100 in a closed state. In this state, the first device housing 102 has been pivoted about the hinge assembly 101 toward the second device housing 103 to a closed position 200. When in the closed position 200, a front surface 202 of the first device housing 102 abuts a front surface 203 of the second device housing 103. Additionally, in this illustrative embodiment, a hinge housing 201 comprising the hinge of the hinge assembly 101 is revealed when the electronic device 100 is in the closed position 200.

In other embodiments, the hinge housing 201 will remain concealed when the first device housing 102 pivots about the hinge assembly 101 relative to the second device housing 103 to the closed position 200. Effectively, in either embodiment, the first device housing 102 and the second device housing 103 are analogous to clam shells that have been shut by the clam, thereby giving rise to the "clamshell" style of device. When the clamshell opens, the flexible display (121) is revealed.

In some embodiments, features can be included to further retain the electronic device 100 in the closed position 200. Illustrating by example, in another embodiment, a mechanical latch can be included to retain the first device housing 102 and the second device housing 103 in the closed position 200.

In still another embodiment, magnets can be incorporated into the front surface 202 of the first device housing 102 and the front surface 203 of the second device housing 103. For instance, magnets can be placed in the first device housing 102 and the second device housing 103 to retain the first device housing 102 and the second device housing 103 in the closed position 200.

In still other embodiments, frictional elements can be incorporated into the hinge assembly 101 to retain the first device housing 102 and the second device housing 103 in a particular position. A stator motor could be integrated into the hinge assembly 101 as well. Still other mechanical structures and devices suitable for retaining the electronic device 100 in the closed position 200 will be obvious to those of ordinary skill in the art having the benefit of this disclosure. As will be described below, in other embodiments retention devices can be omitted due to the fact that torsion springs used in combination with a cam having mechanical detents and a stator with mechanical protrusions are used.

Turning now to FIG. 3, the electronic device 100 is shown being transitioned from the closed position (200) of FIG. 2 to a partially open position 300. Specifically, the first device housing 102 is pivoting about the hinge assembly 101 away from the second device housing 103 toward an open position. The open position 300 shown in FIG. 3 is a "tent position." In the side elevation view of FIG. 3, the hinge housing 201 is exposed between the first device housing 102 and the second device housing 103.

Figures 4, 5:
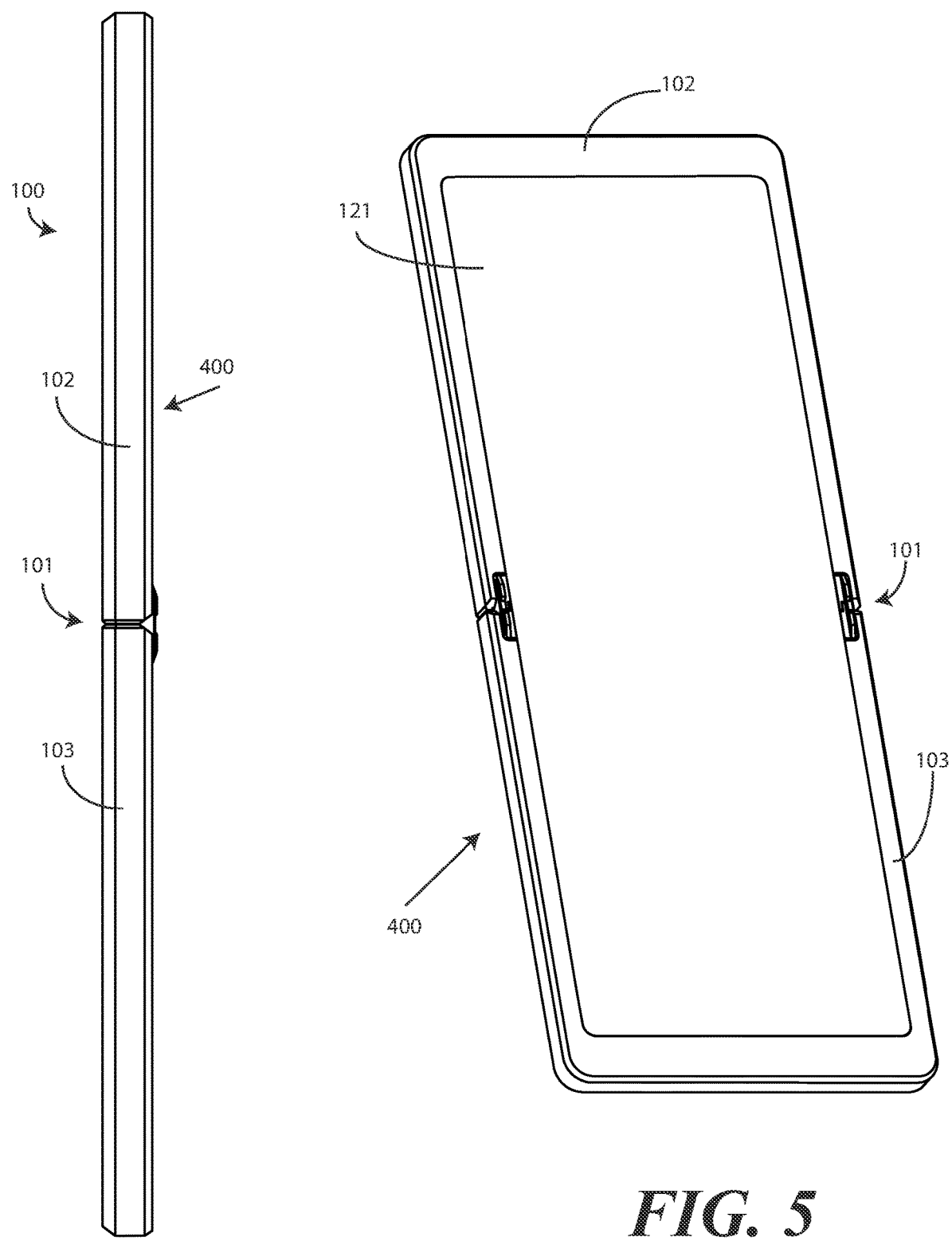
FIG. 4 illustrates a side elevation view of one explanatory electronic device in accordance with one or more embodiments of the disclosure in an axially displaced open position.
FIG. 5 illustrates a perspective view of one explanatory electronic device in accordance with one or more embodiments of the disclosure in the axially displaced open position.

Turning now to FIGS. 4 and 5, illustrated therein is the electronic device 100 in an axially displaced open position 400. In the axially displaced open position 400, the first device housing 102 is rotated about the hinge assembly 101 so as to be axially displaced 180-degrees out of phase with the second device housing 103, thereby revealing the flexible display 121 of this embodiment. In this illustrative embodiment, this causes the hinge housing (201) to be concealed within the first device housing 102 and second device housing 103.

In such a configuration, the first device housing 102 and the second device housing 103 effectively define a plane. Since this illustrative embodiment includes a flexible display 121, the flexible display 121 has been elongated into a flat position.

As noted above, embodiments of the disclosure contemplate that when the flexible display 121 is fixedly coupled to the first device housing 102 and also fixedly coupled to the second device housing 103, with the first device housing 102, hinge housing 201, and second device housing 103 configured to cause the flexible display 121 to extend and become substantially planar when the first device housing 102 and second device housing 103 are in the axially displaced open position 400, the path length of the mechanical mechanism defined by the a first plate of the hinge mechanism, a second plate of the hinge mechanism, and the hinge housing 201 can be different than another path length of the section of the flexible display 121 that bends when each is in the closed position 200. Said differently, where the flexible display 121 is configured to extend flat when in the axially displaced open position 400, when the folding mechanism is in the closed position 200 the length of the service loop defined by the flexible display 121 and the mechanical boundaries defined by the hinge mechanism may be different.

In particular, to provide sufficient room for the service loop, the mechanical mechanism defined by the hinge mechanism may be longer than the length of the flexible display 121 that bends to define the service loop by a predefined amount. This difference in length can be problematic in that it can result in either deformations in the service loop when the mechanism is in the closed position, or alternatively it can result in mechanical strain or unevenness in the flexible display when the mechanism is in the axially displaced open position 400.

While a spring-loaded plate can be used to apply tension to one end of the flexible display to compensate for the distance difference as noted above, embodiments of the disclosure provide an improved hinge mechanism that allows for the flexible display 121 to be fixedly connected to the first device housing 102 and second device housing 103, respectively, as well as to fully extend when the mechanism is in the axially displaced open position 400. At the same time, the hinge mechanism allows the flexible display 121 form a proper service loop when the mechanism is in the closed position 200.

Embodiments of the disclosure accomplish this by employing a hinge mechanism that changes a displacement between the hinge housing 201 and the first device housing 102 and second device housing 103, respectively, as the first device housing 102 and second device housing 103 pivot about the hinge housing 201 between the axially displaced open position 400 and the closed position 200. Effectively, hinges configured in accordance with embodiments of the disclosure cause the hinge housing 201 to get closer to the first device housing 102 and second device housing 103, respectively, when the electronic device is in the axially displaced open position 400, and farther from the hinge housing 201 when the electronic device is in the closed position 200. This changing distance compensates for the difference between the bending length of the flexible display and the length of the mechanical mechanism supporting the flexible display 121.

Figure 6:
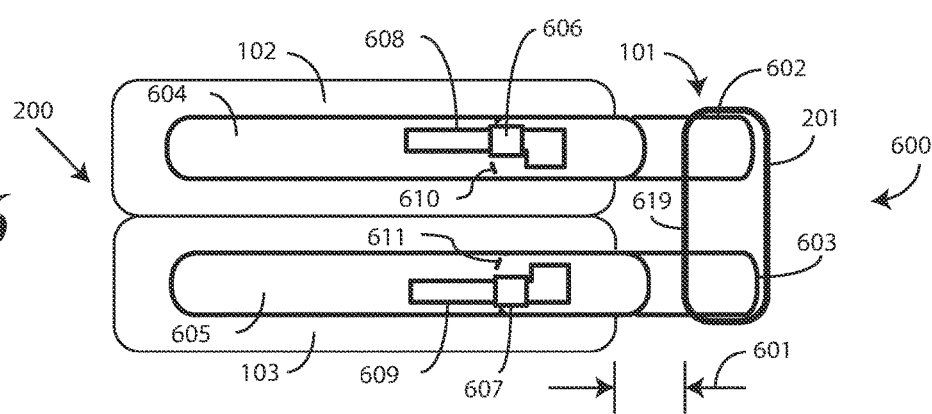
FIG. 6 illustrates a schematic block diagram of a hinge configured in accordance with one or more embodiments of the disclosure with the hinge in a closed position.
Figure 7:
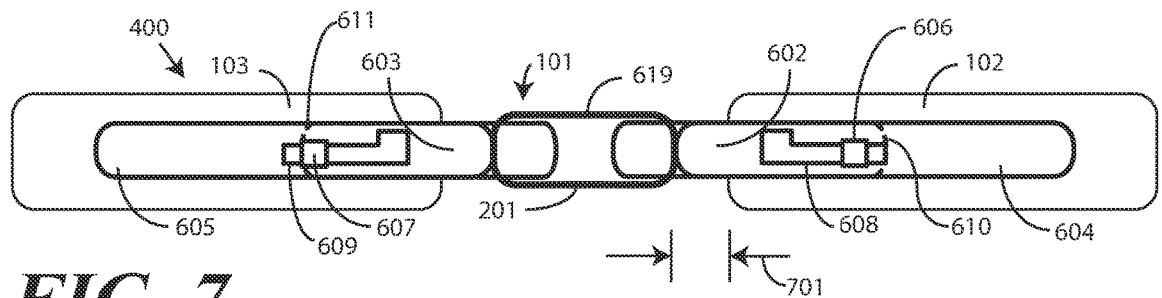
FIG. 7 illustrates a schematic block diagram of a hinge configured in accordance with one or more embodiments of the disclosure with the hinge in an axially displaced open position.

Turning now to FIGS. 6-7, illustrated therein is a general mechanical schematic 600 illustrating one explanatory way this can be accomplished. Shown in FIGS. 6-7 is a hinge mechanism 600 configured to change a displacement 601, 701 between the hinge housing 201 and the first device housing 102 and second device housing 103, respectively, when the first device housing 102 and the second device housing 103 pivot about the hinge housing 201 between the axially displaced open position 400 and the closed position 200.

In one or more embodiments, the hinge housing 201 comprises a hinge assembly 101 that couples a first device housing 102 of an electronic device to a second device housing 103 such that the first device housing 102 is pivotable about the hinge housing 201 relative to the second device housing 103 between a closed position 200 and an axially displaced open position 400. In one or more embodiments, the hinge assembly 101 changes a displacement 601,701 between the first device housing 102 and the second device housing 103, respectively, when the first device housing 102 and the second device housing 103 pivot about the hinge housing 201 between the axially displaced open position 400 and the closed position 200. This allows an interior surface 619 of the hinge housing 201 to be positioned farther from the first device housing 102 and the second device housing 103, respectively, when the first device housing 102 is pivoted about the hinge housing 201 relative to the second device housing 103 to the closed position 200 than when the first device housing 102 is pivoted about the hinge housing 201 relative to the second device housing 103 to the axially displaced open position 400.

In one or more embodiments, the hinge housing 201 is coupled to a first hinge arm 602. The first hinge arm 602 extends into the first device housing 102 and comprises a first pin 606 extending from a terminal edge of the first hinge arm 602. In one or more embodiments, the first pin 606 engages a first slot 608 defined by a first plate 604. In one or more embodiments, the first plate 604 is fixedly coupled to the first device housing 102.

In one or more embodiments, the hinge housing 201 is also coupled to a second hinge arm 603. The second hinge arm 603 extends into the second device housing 103 and comprises a second pin 607 engaging a second slot 609 defined by a second plate 605. In one or more embodiments, the second plate 605 is fixedly coupled to the second device housing 103.

In one or more embodiments, each of the first hinge arm 602 and the second hinge arm 603 is translationally coupled to the first plate 604 and the second plate 605 in that the first pin 606 and the second pin 607 can translate within the first slot 608 and the second slot 609, respectively, when the first device housing 102 and the second device housing 103 pivot about the hinge housing 201 between the axially displaced open position 400 and the closed position 200. As will be shown in more detail below with reference to FIGS. 17-22, in one or more embodiments linking arms couple the first plate 604 and the second plate 605 to the hinge housing 201, which results in this translation. Meanwhile, the first hinge arm 602 and the second hinge arm 603, as well as the linking arms which are not shown in FIGS. 6-7 so that the other components can be more readily seen, are each pivotally coupled to the hinge housing 201 such that the first device housing 102 can pivot about the hinge housing 201 relative to the second device housing 103 between the closed position 200 of FIG. 6 and the axially displaced open position 400 of FIG. 7.

To facilitate a change in displacement between the first device housing 102 and the hinge housing 201, and additionally between the second device housing 103 and the hinge housing 201, in one or more embodiments a sliding mechanism is established between the first hinge arm 602 and the first plate 604 and the second hinge arm 603 and the second plate 605. Meanwhile, a pivoting mechanism is established between the hinge housing 201 and each of the first hinge arm 602 and the second hinge arm 603. The inclusion of this combined sliding mechanism and pivoting mechanism allows each of the first hinge arm 602 and the second hinge arm 603 to translate relative to the first plate 604 and the second plate 605, respectively, as the first hinge arm 602 and second hinge arm 603, and accordingly the first device housing 102 and the second device housing 103, pivot relative to the hinge housing 201 between the closed position 200 of FIG. 6 and the axially displaced open position 400 of FIG. 7.

Illustrating by example, in FIG. 6, the terminal edge 610 of the first hinge arm 602 and the terminal edge 611 of the second hinge arm 603 are positioned such that the first pin 606 and the second pin 607 situate at an end of a translation region of the first slot 608 and the second slot 609, respectively, that is closer to the hinge housing 201 in FIG. 6. By contrast, the terminal edge 610 of the first hinge arm 602 and the terminal edge 611 of the second hinge arm 603 are positioned such that the first pin 606 and the second pin 607 situate at another end of a translation region of the first slot 608 and the second slot 609, respectively, that is farther from the hinge housing 201 in FIG. 7.

As will be explained in more detail with reference to FIGS. 17-22 below, in one or more embodiments linking arms coupled between the hinge housing 201 and the first plate 604 and the second plate 605 apply a force when the first device housing 102 and the second device housing 103 pivot about the hinge housing 201 to cause these sliding mechanisms to move such that the first pin 606 and the second pin 607 translate within the translation regions of the first slot 608 and the second slot 609 when the first hinge arm 602 and second hinge arm 603, and accordingly the first device housing 102 and the second device housing 103, pivot relative to the hinge housing 201 between the closed position 200 of FIG. 6 and the axially displaced open position 400 of FIG. 7. Advantageously, the inclusion of these sliding mechanisms as coupling links between the hinge housing 201 and the first device housing 102 and the second device housing 103, respectively, allows the first pin 606 and the second pin 607 to translate within the translation portions of the first slot 608 and the second slot 609 as the first hinge arm 602 and the second hinge arm 603 pivot between the closed position 200 of FIG. 6 and the axially displaced open position 400 of FIG. 7.

While FIGS. 6 and 7 illustrate general embodiments demonstrating how the hinge assembly 101 facilitate this translation to change the displacement 601,701 between the hinge housing 201 and the first device housing 102 and the second device housing 103 when the first hinge arm 602 and the second hinge arm 603 pivot between the axially displaced open position 400 and the closed position 200, specific mechanisms illustrating how this translation occurs will be shown in subsequent figures. FIGS. 6 and 7 are provided to generally illustrate the concept of translation of the first hinge arm 602 and the second hinge arm 603, with later figures illustrating examples of more specific embodiments.

Figure 8:
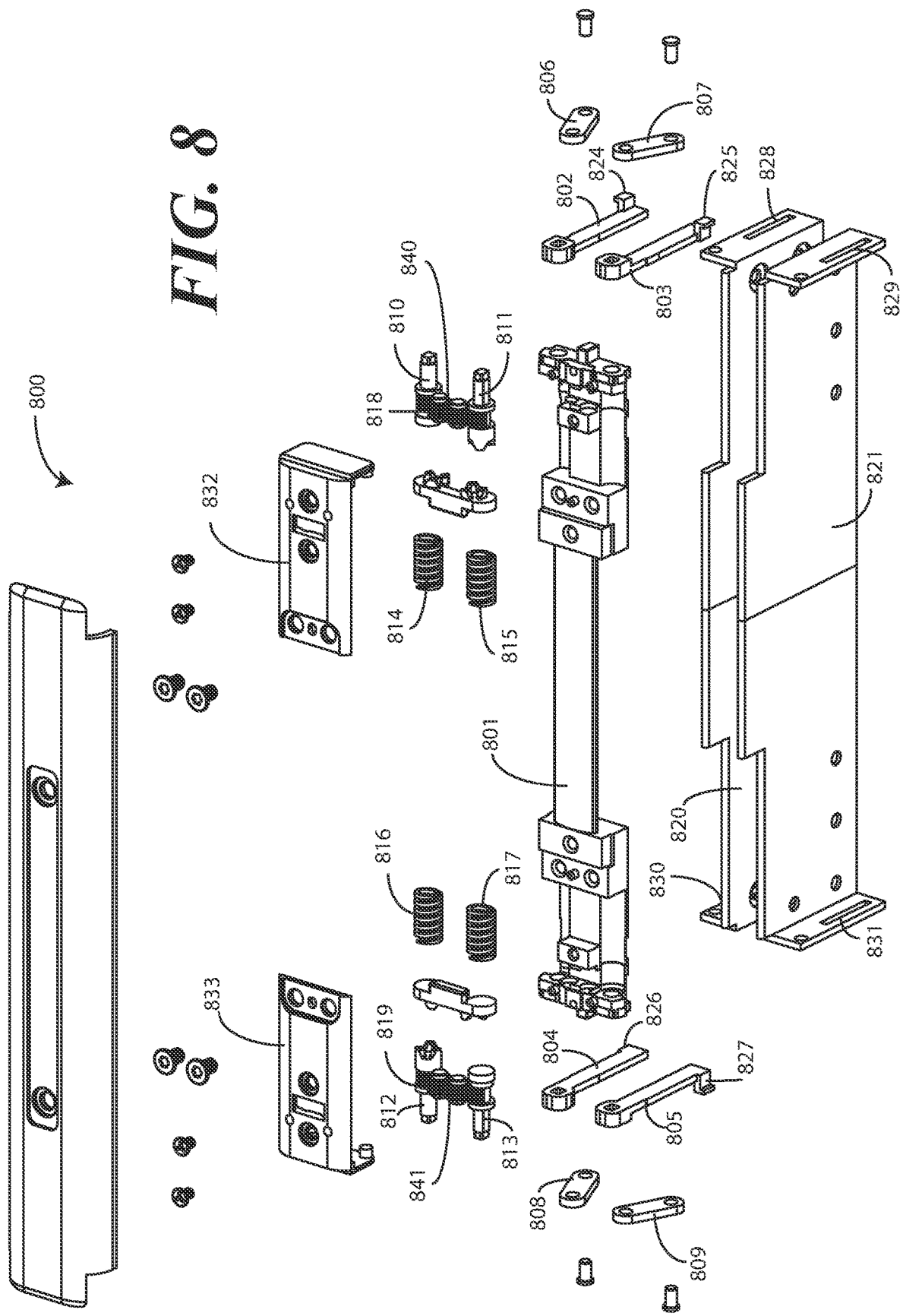
FIG. 8 illustrates an exploded view of one explanatory hinge assembly configured in accordance with one or more embodiments of the disclosure.

Accordingly, with this general concept understood from a basic embodiment, attention will now be turned to one explanatory implementation of the concept of FIGS. 6-7 to demonstrate one illustrative example of how the concept can be implemented in an electronic device. Turning now to FIG. 8, illustrated therein is one explanatory hinge assembly 800 configured in accordance with one or more embodiments of the disclosure.

As shown in FIG. 8, the hinge assembly 800 comprises a hinge housing 801 that serves as a housing for a hinge mechanism. In the illustrative embodiment of FIG. 8, the hinge mechanism comprises hinge arms 802,803,804,805, linking arms 806,807,808,809, rotating posts 810,811,812, 813, tensioning springs 814,815,816,817, interlocking gears 818,819, and plates 820,821. These components defining the hinge mechanism are coupled to the hinge housing 801. When implemented in an electronic device (100) having a first device housing (102) and a second device housing (103), hinge arms 802,804 are coupled to the hinge housing 801 and extend into the first device housing (102). Similarly, hinge arms 803,805 are coupled to the hinge housing 801 and extend into the second device housing (103).

In one or more embodiments, each hinge arm 802,803, 804,805 comprises a pin 824,825,826,827 extending distally from its respective hinge arm 802,803,804,805. In the illustrative embodiment of FIG. 8, each pin 824,825,826,827 extends distally from a terminal edge of its respective hinge arm 802,803,804,805. However, in other embodiments the pins 824,825,826,827 extend distally from another portion of the hinge arm 802,803,804,805, examples of which include a midpoint of the hinge arm 802,803,804,805, a three-quarter point of the hinge arm 802,803,804,805, an eighty-percent point of the hinge arm 802,803,804,805, or a ninety-percent point of the hinge arm 802,803,804,805. These measurements, e.g., three-quarter, eighty percent, and ninety percent, indicate the portion of the length of the hinge arm from the point coupled to the hinge housing 801. Other locations suitable for the locations from which the pins 824,825,826,827 extend from the hinge arms 802,803,804, 805 will be obvious to those of ordinary skill in the art having the benefit of this disclosure.

In one or more embodiments, each pin 824,825,826,827 engages a slot 828,829,830,831 defined by each plate 820, 821. Illustrating by example, in the explanatory embodiment of FIG. 8, a first hinge arm 802 is coupled to the hinge housing 801 and extends into the first device housing (102) with a first pin 824 extending distally from a terminal edge of the first hinge arm 802 that engages a slot 828 defined by a first plate 820. In one or more embodiments, the first plate 820 is fixedly coupled to the first device housing (102). Similarly, a second hinge arm 803 is coupled to the hinge housing 801 and extends into the second device housing (103), with the second hinge arm 803 comprising a second pin 825 extending from a terminal edge of the second hinge arm 803 that engages a slot 829 defined by a second plate 821. In one or more embodiments, the second plate 821 is fixedly coupled to the second device housing (103).

Figure 11:
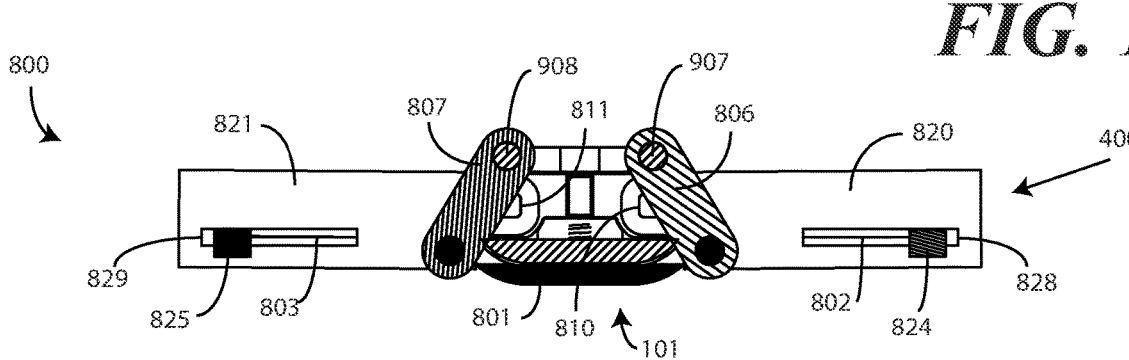
FIG. 11 illustrates a sectional view of a first explanatory hinge assembly configured in accordance with one or more embodiments of the disclosure in the axially displaced open position.
Figure 12:
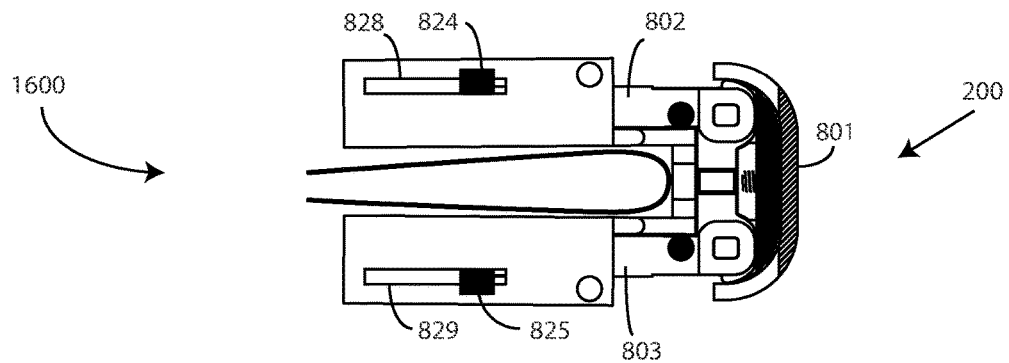
FIG. 12 illustrates a side elevation view of a second explanatory hinge assembly configured in accordance with one or more embodiments of the disclosure in the closed position.

As with the general embodiment of FIGS. 11-12, in FIG. 8 the hinge mechanism is configured to change a displacement between the hinge housing 801 and the first device housing (102) and second device housing (103), respectively, when the first device housing (102) and the second device housing (103) pivot about the hinge housing 801 between the axially displaced open position (400) and the closed position (200). In one or more embodiments, the displacement is shorter when the first device housing (102) and the second device housing (103) are pivoted about the hinge housing 801 to the axially displaced open position (400) than when the first device housing (102) and second device housing (103) are pivoted about the hinge housing 801 to the closed position (200).

To accomplish this, in one or more embodiments the pins 824,825,826,827 each translate within their respective slots 828,829,830,831 when the first device housing (102) and the second device housing (103) pivot about the hinge housing 801 between the axially displaced open position (400) and the closed position (200). In one or more embodiments, this translation of these pins 824,825,826,827 within their respective slots 828,829,830,831 changes a displacement between the hinge housing 801 and the first device housing (102) and second device housing (103).

For example, looking at the right side of the hinge assembly 800, in one or more embodiments a first pin 824 would translate within a first slot 828 of the first plate 820, while a second pin 825 would translate within a second slot 829 of the second plate 821 when the first device housing (102) and second device housing (103) rotate about the hinge housing 801 between the closed position (200) and the axially displaced open position (400). This translation changes the displacement between the first device housing (102) and the hinge housing 801 and the second device housing (103) and the hinge housing 801. In one or more embodiments, the displacement is shorter when the first device housing (102) and the second device housing (103) are pivoted about the hinge housing 801 to the axially displaced open position (400) than when the first device housing (102) and the second device housing (103) are pivoted about the hinge housing 801 to the closed position (200).

This translation is mechanically the caused by the coupling of the linking arms 806,807,808,809 between the hinge housing 801 and each plate 820,821. Illustrating by example, again looking at the right side of the hinge assembly 800, a first linking arm 806 is coupled between the hinge housing 801 and the first plate 820. Similarly, a second linking arm 807 is coupled between the hinge housing 801 and the second plate 821.

In one or more embodiments, the linking arms 806,807, 808,809 and the hinge arms 802,803,804,805 are coupled to the hinge housing 801 at different pivot centers. For example, a first hinge arm 802 would pivot about a first pivot center at the hinge housing 801 while the first hinge arm 802 pivots about the hinge housing 801 at a second pivot center. The second linking arm 807 would pivot about the hinge housing 801 at a third pivot center, while the fourth hinge arm 805 pivots about a fourth pivot center at the hinge housing 801, and so forth. These pivot centers will be shown and described in more detail with reference to FIGS. 9-11 below.

Figure 9:
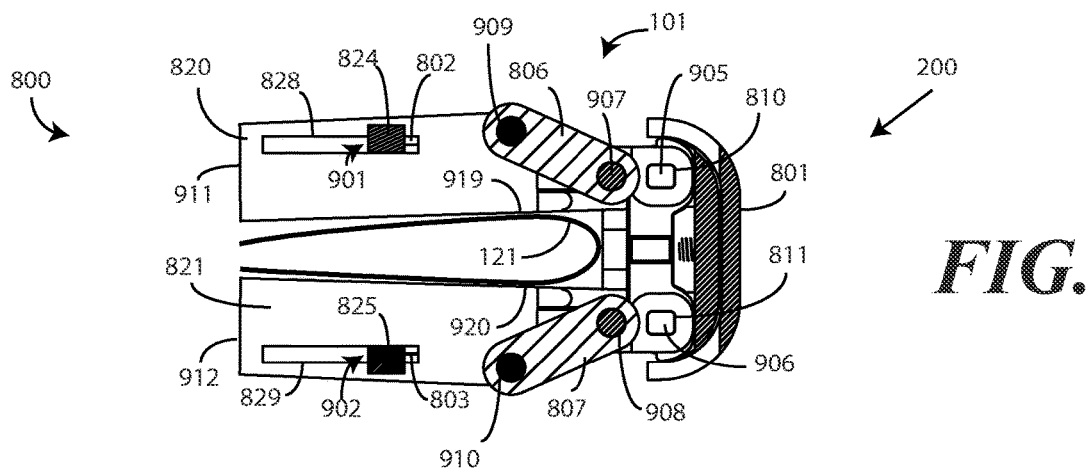
FIG. 9 illustrates a sectional view of a first explanatory hinge assembly configured in accordance with one or more embodiments of the disclosure in the closed position.
Figure 10:
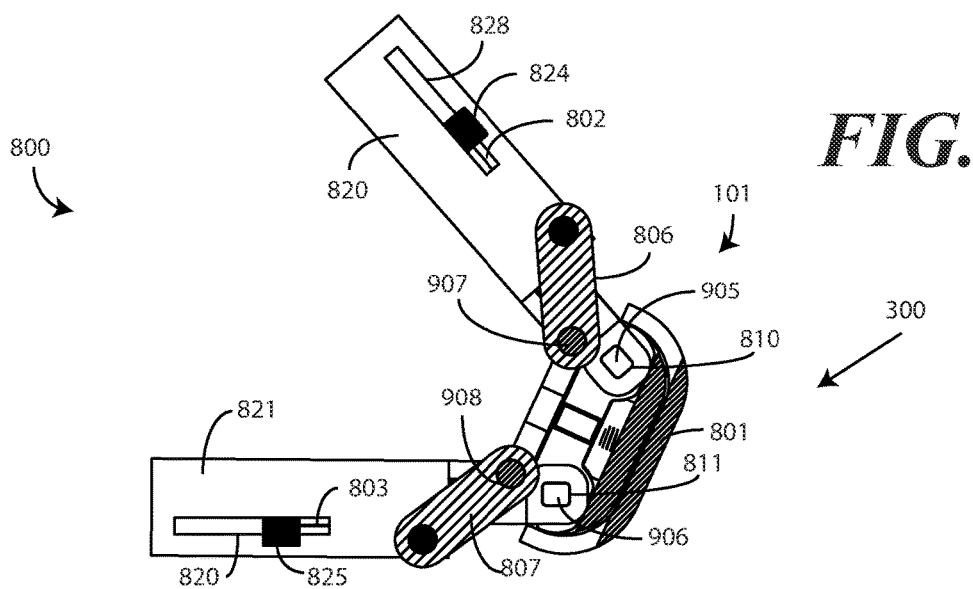
FIG. 10 illustrates a sectional view of a first explanatory hinge assembly configured in accordance with one or more embodiments of the disclosure in the partially open position.

While FIGS. 9-11 illustrate how the different pivot centers function to alter the displacement between the hinge housing 801 and the first device housing (102) and the second device housing (103), FIG. 8 illustrates examples of each pivot center as well. In one or more embodiments, each hinge arm 802,803,804,805 couples to a rotating post 810,811,812,813. For example, the first hinge arm 802 would couple to a first rotating post 810, while a second hinge arm 803 would couple to a second rotating post 811, and so forth.

In one or more embodiments, each rotating post 810,811, 812,813 defines a cross section that is rectangular and that engages a correspondingly rectangular aperture defined by its corresponding hinge arm 802,803,804,805. These rectangular posts work as keys within the arched apertures of the hinge arms 802,803,804,805 so that rotation of the hinge arms 802,803,804,805 also rotates the rotating posts 810, 811,812,813. Accordingly, in one or more embodiments each hinge arm 802,803,804,805 defines a rectangular aperture positioned about a rectangular post situated at the end of the rotating posts 810,811,812,813 having a central axis defining a pivot center for each of the hinge arms 802,803, 804,805.

In one or more embodiments, the linking arms 806,807, 808,809 couple between a post extending distally from each plate 820,821 and another post extending distally from an end cover 832,833 that couples to the hinge housing 801 using one or more screws. The posts extending distally from each end cover 832,833 (two are shown in FIG. 8 but there are four in this illustrative embodiment) define pivot centers for the linking arms 806,807,808,809 that have central axes that are parallel with, but not colinear with, the pivot centers defined by the rotating posts 810,811,812,813. Thus, while the rotating posts 810,811,812,813 would define two pivot centers (one by an axis passing through rotating posts 810,812 about which hinge arms 802,804 rotate and another by an axis passing through rotating posts 811,813 about which hinge arms 803,805 rotate), the posts extending from the end covers 832,833 would define a third pivot center about which linking arms 806,808 rotate and a fourth pivot center about which linking arms 807,809 rotate. In one or more embodiments, axes passing through these four pivot centers are each parallel, but are not concentrically aligned with any other pivot center axis. This will be shown in more detail below in FIGS. 9-11.

In one explanatory embodiment, a first end of each linking arm 806,807,808,809 pivots about the posts extending from the end covers 832,833, which extend distally inward from interior edge portions of each end cover 832,833 in FIG. 8. As shown in the figure, in this illustrative embodiment the end covers 832,833 are separate components from the hinge housing 801 that are coupled to the hinge housing 801 by the multiple screws shown. However, in other embodiments the end covers 832,833 could components of the hinge housing 801 that are integrally formed with the hinge housing 801 as a singular component. Where this is the case, a first end of the linking arms 806,807,808,809 would then couple directly to the hinge housing 801, with the second end of each linking arm 806,807,808,809 coupling to each plate 820,821. This would result in the first ends of the linking arms 806,807,808,809 pivoting around posts extending from the hinge housing 801, while the second ends of the linking arms 806,807,808,809 pivoting about posts extending from the plates 820,821.

As best seen by looking at pin 827, in one or more embodiments each pin 824,825,826,827 define an L-shaped cross section. This L-shaped cross section allows each pin 824,825,826,827 to be captively held within a translation section of its corresponding slot 828,829,830,831. In one or more embodiments, each slot 828,829,830,831 defines both an insertion section, through which the base of the L-shaped cross section can be inserted, and a translation section where only the upper portion of the L-shaped cross section may pass. When the pins 824,825,826,827 are within the translation sections of each slot 828,829,830,831, this allows the base of the L-shaped cross section to captively retain each pin 824,825,826,827 within the translation section of each slot 828,829,830,831. In one or more embodiments, to make movement easier and to avoid snagging, the upper section of each L-shaped cross section defines a chamfered rectangular cross section.

In one or more embodiments, this chamfered rectangular cross section situates within a rectangular perimeter of the translation section of each slot 828,829,830,831 such that the upper portion of the L-shaped cross section of each pin 824,825,826,827 can translate within the translation section of each slot 828,829,830,831 between at least a first location within each slot 828,829,830,831 and a second location within the translation section of each slot 828,829,830,831 as the hinge arms 802,803,804,805 rotate relative to the hinge housing 801. This ability to translate occurs due to the fact that the width of the translation section of each slot 828,829,830,831 is greater than that of the upper portion of the L-shaped cross sections of the pins 824,825,826,827. This translation, as well as the first location and second location, will be shown in more detail below with reference to FIGS. 9-11.

In one or more embodiments, the first location is more centrally located within the slots 828,829,830,831, i.e., is closer to the hinge housing 801 and more toward the middle of the translation sections of the slots 828,829,830,831, than the second location, which is more toward the end of each slot 828,829,830,831 and away from the hinge housing 801. In one or more embodiments, upper portions of the L-shaped cross sections of the pins 824,825,826,827 situate at the first location of the slots 828,829,830,831 when the first device housing (102) pivots about the hinge housing 801 to the closed position (200). Similarly, upper portions of the L-shaped cross sections of the pins 824,825,826,827 situate at the second location of the slots 828,829,830,831 when the first device housing (102) pivots about the hinge housing 801 to the axially displaced open position (400). This translating action changes the displacement (610) between the hinge housing 801 and the first device housing (102) and second device housing (103).

As noted above, in one or more embodiments each rotating post 810,811,812,813 defines a rectangular post. In one or more embodiments, each hinge arm 802,803,804,805 then defines a rectangular aperture that situates around the rectangular post section of the rotating posts 810,811,812, 813 in a key-keyhole relationship.

In one or more embodiments, each rotating post 810,811, 812,813 is coupled to a cam having multiple detents in its face. When the hinge is assembled, the cam abuts a stator having protrusions that situate within the detents appearing in the face of the cam. In one or more embodiments, the stator is coupled to a tensioning spring 814,815,816,817. When the hinge arms 802,803,804,805 pivot the rotating posts 810,811,812,813 relative to the hinge housing 801, this causes the cams coupled to the rotating posts 810,811,812, 813 to rotate. This rotation, in turn, rotates the stators, causing the tensioning springs 814,814,816,817 to compress as the protrusions move into, and out of, the detents of the cam. This spring action allows the device housings coupled to the plates 820,821 to situate at predefined angles, which can include the axially displaced open position (400) and closed position (200), when the protrusions fully situate within the detents.

In one or more embodiments, the interlocking gears 818,819 also situate against corresponding gears 840,841 linking the interlocking gears 818,819 of each rotating post 810,811,812,813 such that the interlocking gears 818,819 and the corresponding gears 840,841 interlock. When one rotating post, e.g., rotating post 810, rotates due to one device housing pivoting relative to the hinge housing 801, the interlocking gears 818,819 cause another rotating post, e.g., rotating post 811, to also rotate via the corresponding gears 840,841. This means that hinge arm 802 and hinge arm 803 always rotate axially about the hinge housing 801 at the same angular rate. The same is true with hinge arm 804 and hinge arm 805. The result is a symmetrical rotation of the first device housing (102) and the second device housing (103) about the hinge housing 801 at all times.

In one or more embodiments the interlocking gears 818, 819 comprise a first toothed wheel and a second toothed wheel that engage a first toothed wheel and second toothed wheel of the corresponding gears 840,841 when the first device housing (102) pivots about the hinge housing 801 relative to the second device housing (103). The engagement of the first toothed wheel and the second toothed wheel of the interlocking gears 818,819 with the first toothed wheel and second toothed wheel of the corresponding gears 840, 841 causes a symmetric angular rotation of the first device housing (102) and the second device housing (103) when the first device housing (102) pivots about the hinge housing 801 relative to the second device housing (103). Accordingly, in one or more embodiments when the interlocking gears 818,819 are operatively coupled to the hinge arms 802,803,804,805 and plates 820,821 via the rotating posts 810,811,812,813 and the linking arms 806,807,808,809, the interlocking gears 818.819 cause a symmetric angular rotation of the hinge arms 802,803,804,805 and plates 820,821 when the first device housing (102) pivots about the hinge housing 801 relative to the second device housing (103).

When the hinge arms 802,803,804,805 and plates 820,821 rotate relative to the hinge housing 801 between the closed position (200) and the axially displaced open position (400), the linking arms 806,807,808,809 act as both checkrein and pushrod upon the plates 820,821 relative to the hinge housing 801, thereby causing the pins 824,825,826,827 of the hinge arms 802,803,804,805 to slide closer to the hinge housing 801 within the slots 828,829,830,831 when the hinge assembly 800 is in the closed position (200), and distally farther away from the hinge housing 801 within the slots 828,829,830,831 when the hinge assembly 800 is in the axially displaced open position (400). Said differently, by acting as both checkrein and pushrod, the linking arms 806,807,808,809 cause the pins 824,825,826,827 of the hinge arms 802,803,804,805 situated within the slots 828, 829,830,831 of the plates 820,821 to translate between the first location of the translation sections of the slots 828,829, 830,831 and the second location of the translation sections of the slots 828,829,830,831.

More particularly, the linking arms 806,807,808,809 cause the upper portions of the L-shaped cross sections of the pins 824,825,826,827 of the hinge arms 802,803,804, 805 situated within the translation sections of the slots 828,829,830,831 to situate at the first location when the first device housing (102) coupled to plate 820 is pivoted about the hinge housing 801 to the axially displaced open position (400) relative to the second device housing (103) coupled to plate 821, and to situate at the second location when the first device housing (102) coupled to plate 820 is pivoted about the hinge housing 801 to the axially displaced closed position relative to the second device housing (103) coupled to plate 821. Again, this action will be illustrated in detail below with reference to FIGS. 9-11. A perspective view 1500 of the hinge assembly 800 is shown in its assembled configuration in FIG. 15.

Turning now to FIGS. 9-11, illustrated therein is another view of the hinge assembly 800 when assembled for use in the electronic device (100) of FIGS. 1-5. The views of FIGS. 9-11 illustrate the components of the hinge assembly 800 as they would appear when the electronic device (100) transitions between the closed position 200 and the axially displaced open position 400. FIG. 9 illustrates the hinge assembly 800 in the closed position 200, while FIG. 11 illustrates the hinge assembly 800 in the axially displaced open position 400. FIG. 10 illustrates the hinge assembly 800 in a partially open position 300 or "tent" position.

For simplicity of illustration, the first device housing (102) and the second device housing (103) are not shown in FIGS. 9-11. However, the hinge assembly 800 of FIGS. 9-11 can be coupled to the electronic device (100) of FIGS. 1-5. This electronic device (100) is shown with the flexible display (121) coupled thereto. One of ordinary skill in the art having the benefit of this disclosure, when viewing FIGS. 9-11 in the context of FIGS. 1-5 will readily understand how the hinge assembly 800 couples to the electronic device (100).

As previously described above with reference to FIGS. 1-5, in one or more embodiments an electronic device (100) into which the hinge assembly 800 is coupled includes a first device housing (102) and a second device housing (103). A hinge housing 801 comprising a hinge assembly 101 and couples the first device housing (102) to the second device housing (103). In one or more embodiments, a first plate 820 is fixedly coupled to the first device housing (102), while a second plate 821 is fixedly coupled to the second device housing (103).

In one or more embodiments, the hinge housing 801 is coupled to a first hinge arm 802 and a second hinge arm 803. The first hinge arm 802 extends to a first distal hinge arm end 901 comprising a first pin 824 captively retained within a translation section of a slot 828 defined by a first plate 820 coupled to the first device housing (102). The second hinge arm 803 extends to a second distal hinge arm end 902 comprising a second pin 825 captively retained within a translation section of another slot 829 defined by a second plate 821 coupled to the second device housing (103).

By comparing FIGS. 9-11, it can be seen that the first pin 824 translates within the translation section of the first slot 828, which defines a first translation slot, and the second pin 825 translates within the translation section of the second slot 829, which defines a second translation slot, respectively, when the first plate 820, which is coupled to the first device housing (102), pivots about the hinge housing 801 relative to the second plate 821, which is coupled to the second device housing (103), between the axially displaced open position 400 and the closed position 200. By comparing FIGS. 9 and 11, it can be seen that this translation of the first pin 824 within the translation section of the first slot 828 and translation of the second pin 825 within the translation section of the second slot 829 changes a displacement between the hinge housing 801 and the first device housing (102) to which the first plate 820 is coupled and the second device housing (103) to which the second plate 821 is coupled.

The displacement is shorter when the first device housing (102) to which the first plate 820 is coupled and the second device housing (103) to which the second plate 821 is coupled are pivoted about the hinge housing 801 to the axially displaced open position 400 than when the first device housing (102) to which the first plate 820 is coupled and the second device housing (103) to which the second plate 821 is coupled are pivoted to the closed position 200. This is evidenced by the fact that the first pin 824 situates at a distal end of the translation section (which is the section of the slot 828 in which the pin 824 moves between FIGS. 9 and 11) of the first slot 828 relative to the hinge housing 801, with the second pin 825 situating at a distal end of the translation section (also the section of the slot 829 in which the pin 825 moves between FIGS. 9 and 11) of the second slot 829 relative to the hinge housing 801, in FIG. 11. By contrast, the first pin 824 situates at a proximal end of the translation section of the first slot 828 relative to the hinge housing 801, with the second pin 825 situating at a proximal end of the translation section of the second slot 829 relative to the hinge housing 801, in FIG. 11.

In effect, the first hinge arm 802 and second hinge arm 803 extend distally further into the first device housing (102)

and second device housing (103), respectively, in the axially displaced open position 400 than in the closed position 200. Looking at it another way, the first plate 820 to which the first device housing (102) is coupled and the second plate 821 to which the second device housing (103) is coupled are drawn toward the hinge housing 801 in the axially displaced open position 400 via the translation of the first pin 824 through the translation section of the first slot 828 and the translation of the second pin 825 through the translation section of the second slot 829, respectively, as the hinge assembly 800 transitions from the closed position 200 to the axially displaced open position 400.

This translation is mechanically the caused by the coupling of the linking arms 806,807 between the hinge housing 801 and each plate 820,821. Illustrating by example, a first linking arm 806 is coupled between the hinge housing 801 and the first plate 820. Similarly, a second linking arm 807 is coupled between the hinge housing 801 and the second plate 821.

In one or more embodiments, the linking arms 806,807 and the hinge arms 802,803 are coupled to the hinge housing 801 at different pivot centers 905,906,907,908. For example, the first hinge arm 802 pivots about the hinge housing 801 at a first pivot center 905, while the first linking arm 806 pivots about the hinge housing 801 at a second pivot center 907. The second hinge arm 803 then pivots about the hinge housing 801 at a third pivot center 906, while the second linking arm 807 pivots about the hinge housing 801 at a fourth pivot center 908, and so forth. These different pivot centers 905,906,907,908 function to alter the displacement between the hinge housing 801 and the first device housing (102) to which the first plate 820 is coupled and the second device housing (103) to which the second plate 821 is coupled.

As shown in FIGS. 9-11, each hinge arm 802,803 couples to a rotating post 810,811 that define the first pivot center 905 and the third pivot center 906. In one or more embodiments, each rotating post 810,811 defines a cross section that is rectangular and that engages a correspondingly rectangular aperture defined by its corresponding hinge arm 802,803. Advantageously, this rectangular shape of the apertures in the hinge arms 802,803 situated about the rotating posts 810,811 prevents any wobbling or non-aligned with the pivot center rotation from occurring.

These rectangular posts work as keys within the rectangular apertures of the hinge arms 802,803 so that rotation of the hinge arms 802,803 also rotates the rotating posts 810,811. In one or more embodiments, the first hinge arm 802 defines a rectangular aperture positioned about the rectangular post defined by the first rotating post 810, while the second hinge arm 803 defines another rectangular aperture positioned about another rectangular post defined by the second rotating post 811. Accordingly, in one or more embodiments each hinge arm 802,803 defines a rectangular aperture positioned about a rectangular post situated at the end of the rotating posts 810,811 having a central axis defining a pivot center for each of the hinge arms 802,803. These rectangular apertures are shown illustratively in FIGS. 9-11.

In FIGS. 9-11, the end covers (832,833) that couple to the hinge housing 801 are not shown so that the pivot centers 907,908 of the linking arms 806,807 can be seen. As shown, the linking arms 806,807 couple between these pivot centers 907,908 and another pivot center 909,910 situated at the first plate 820 and the second plate 821, respectively. The pivot centers 907,908,909,910 for the linking arms 806,807 that have central axes that are parallel with, but not colinear with, the pivot centers 905,906 defined by the rotating posts 810,811.

Thus, while the rotating posts 810,811 define two pivot centers 905,906 (one by an axis passing through rotating posts 810,812 about which hinge arms 802,803 rotate), the posts extending from the end covers (832,833) define other pivot centers 907,908 about which linking arms 806,807 rotate. As shown in FIGS. 9-11, the axes passing through pivot centers 905,906 and through pivot centers 907,908 are each parallel, but are not concentrically aligned with any other pivot center axis.

As shown in FIGS. 9-11, the first pin 824 and the second pin 825 have their pin heads exposed through the translation sections of the first slot 828 and the second slot 829, respectively. The pin heads of the first pin 824 and the second pin 825 captively retain the first pin 824 and the second pin 825 in the translation sections of the first slot 828 and the second slot 829, respectively. In one or more embodiments each of the first pin 824 and the second pin 825 define a chamfered rectangular cross section to prevent snags and hang one or more user preferred settings within the translation sections of the first slot 828 and the second slot 829. In the illustrative embodiment of FIGS. 9-11, each pin head also has a chamfered rectangular cross section, albeit both wider and longer than the cross section of the first pin 824 and the second pin 825 to captively retain the first pin 824 and the second pin 825 in the first slot 828 and the second slot 829, respectively.

As can be seen by the fact that, in FIG. 9, the first pin head engages only the upper outer surface of the translation section of the first slot 828 and the second pin head engages only the lower outer surface of the translation section of the second slot 829, in this illustrative embodiment each of the first pin 824 and the second pin 825 define an L-shaped cross section (sticking out of the page in FIG. 9) with the lower part of the L-shaped cross section extending upward from the first pin 824 and downward from the second pin 825. The L-shaped cross section works to avoid friction since the lower part of the L-shaped cross section only passes along one side of the translation sections of the first slot 828 and the second slot 829. However, the first pin 824 and the second pin 825 can have other cross sections as well. Illustrating by example, in another embodiment the first pin 824 and the second pin 825 could have a T-shaped cross section with the upper part of the T-shaped cross section passing along two sides of the translation sections of the first slot 828 and the second slot 829 as well. Still other configurations will be obvious to those of ordinary skill in the art having the benefit of this disclosure. The use of an L-shaped cross section also helps to make the insertion sections of the first slot 828 and the second slot 829 smaller as well.

As shown in FIG. 9, when the hinge assembly 800 is in the closed position 200, proximal ends 919,920 (relative to the hinge housing 801) of the first plate 820 and the second plate 821 are separated a greater distance apart than are the distal ends 911,912. When the first device housing (102) is fixedly coupled to the first plate 820 and the second device housing (103) is fixedly coupled to the second plate 821 this greater separation allows the ends of the first device housing (102) and the second device housing (103) to abut, as shown above in FIG. 2, while the ends of the first device housing (102) and the second device housing (103) situated proximally with the hinge housing 801 separate to allow the flexible display 121 to define a service loop between those proximal ends as shown in FIG. 9.

Figure 15:
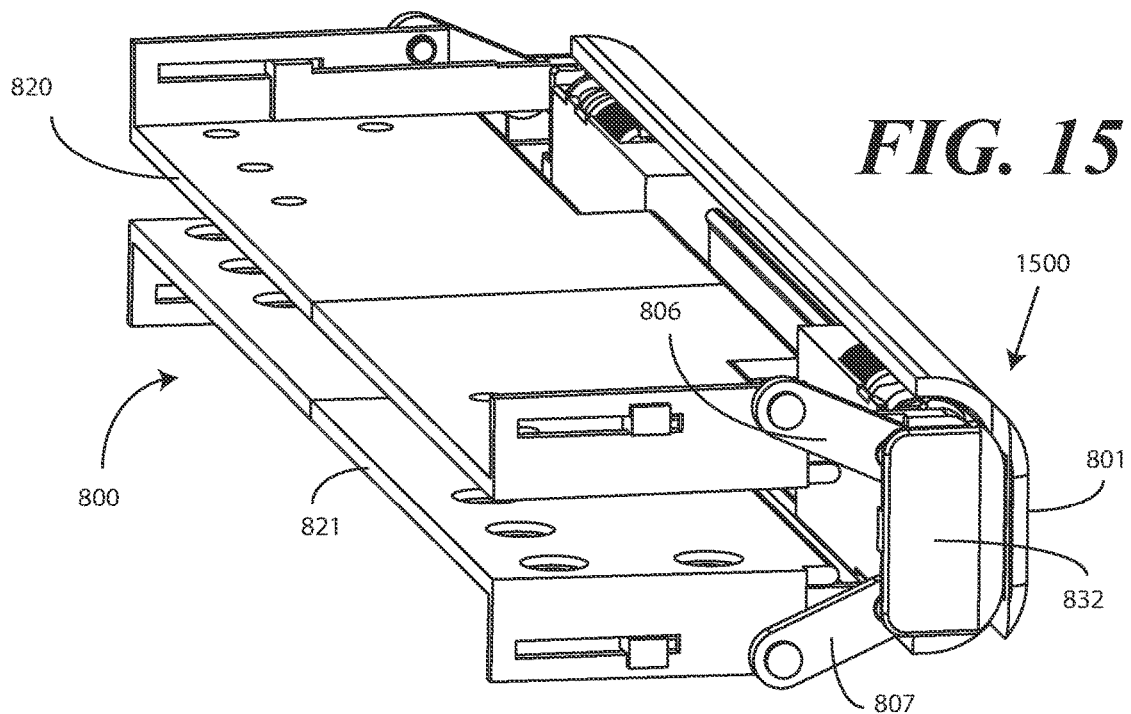
FIG. 15 illustrates another perspective view of a first explanatory hinge assembly configured in accordance with one or more embodiments of the disclosure in the closed position.
Figure 16:
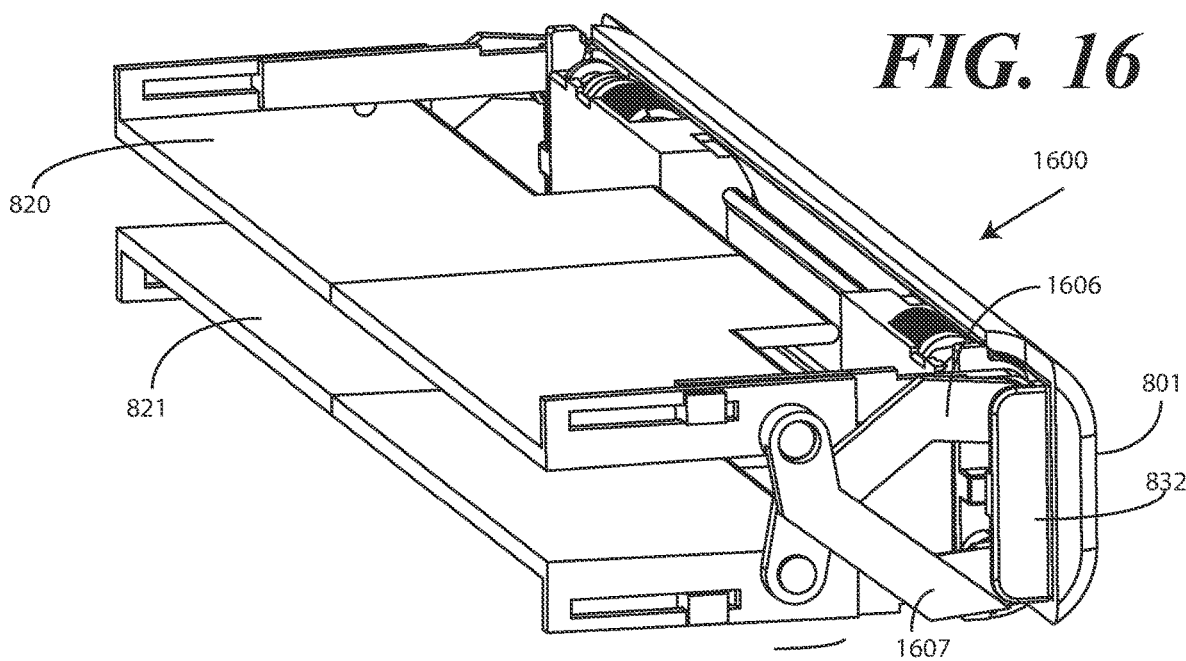
FIG. 16 illustrates another perspective view of a second explanatory hinge assembly configured in accordance with one or more embodiments of the disclosure in the closed position.

Turning now to FIG. 16, illustrated therein is an alternate hinge assembly 1600 shown in an assembled configuration. The hinge assembly 1600 is substantially the same as the hinge assembly 800 described above with reference to FIGS. 6-11 and 15, with one significant exception, namely, the configuration of the linking arms 1606,1607.

In the hinge assembly 800 of FIG. 15, the linking arms 806,807 are configured in a Y-shaped configuration with the linking arms 806,807 defining the upper part of the Y-shape and the end cover 832 defining the base of the Y-shape. The linking arms 806,807 couple to the end cover 832 and then extend distally from the end cover 832 away from each other to define a Y-shape that is turned sideways to the left in FIG. 15.

By contrast, in FIG. 16 the linking arms 1606,1607 are configured in a crisscross shape with the first linking arm 1606 crossing the second linking arm 1607 to form a crossed configuration. This results in each linking arm 1606,1607 of FIG. 16 coupling to a different plate 820,821 than do the linking arms 806,807 of FIG. 15. While the first linking arm 806 couples to the first plate 820 in FIG. 15, the first linking arm 1606 of FIG. 16 couples to the second plate 821 in FIG. 16. Similarly, while the second linking arm 807 couples to the second plate 821 in FIG. 15, the second linking arm 1607 of FIG. 16 couples to the first plate 820 in FIG. 16. Otherwise, the components of the hinge assembly 1600 of FIG. 16 are largely the same as those of the hinge assembly 800 of FIG. 15, which means that the description of those components above with reference to FIG. 6 applies to FIG. 16 as well.

One other difference between the hinge assembly 800 of FIG. 15 and the hinge assembly 1600 of FIG. 16 involves the shape of the linking arms 1606,1607. While the linking arms 806,807 of FIG. 15 are straight, the linking arms 1606,1607 each define a hockey stick shape. It should be noted that the hockey stick shape is included to show one alternative shape the linking arms 1606,1607 could take. The linking arms 1606,1607 of FIG. 16 could be straight instead of hockey stick shaped as well. Other shapes for the linking arms 1606,1607 will be obvious to those of ordinary skill in the art having the benefit of this disclosure.

Specifically, as shown in FIG. 16 each of the linking arms 1606,1607 is shown illustratively as having a hockey stick shape. Illustrating by example, the first linking arm 1606 has a hockey stick bend as it extends from the end cover 832 to the second plate 821, with the portion of the hockey stick that hits the puck coupled to the second plate 821. Similarly, the second linking arm 1607 has a hockey stick bend as it extends from the end cover 832 to the first plate 820, with the portion of the hockey stick that hits the puck coupled to the first plate 820. The handles of each hockey stick defined by the linking arms 1606,1607 are coupled to the end cover 832 in FIG. 16. Accordingly, in this illustrative embodiment each linking arm 1606,1607 comprises a hockey stick linking arm positioned between the respective pivot centers.

As with the hinge assembly 800 of FIG. 15, in the hinge assembly 1600 of FIG. 16, ends of the first plate 820 and the second plate 821 proximally situated with the hinge housing 801 are physically separated from each other when the electronic device is in the closed position 200. The ends of the first plate 820 and the second plate 821 that are situated distally from the hinge housing 801 are closer together than are the ends of the first plate 820 and the second plate 821 proximally situated with the hinge housing 801. When a first device housing (102) is fixedly coupled to the first plate 820, and a second device housing (103) is fixedly coupled to the second plate 821, such as with the screws shown in FIG. 6, this results in ends of the first device housing (102) and the second device housing (103) proximally situated with the hinge housing 801 being physically separated from each other when the corresponding electronic device (100) is in the closed position 200. When a flexible display (121) spans the hinge housing 801, with a first end of the flexible display (121) fixedly coupled to the first device housing (102) and a second end of the flexible display (121) fixedly coupled to the second device housing (103), as shown in FIGS. 1 and 5, this allows the flexible display (121) to define a service loop as shown above in FIG. 9.

Figure 13:
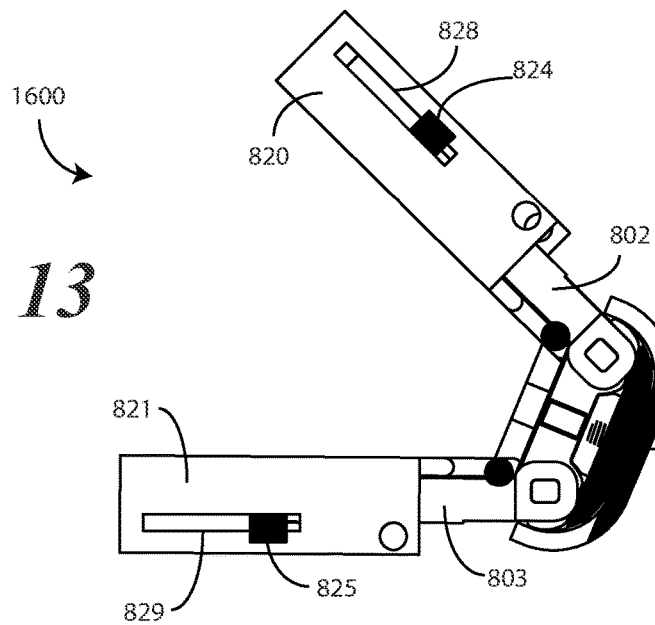
FIG. 13 illustrates a side elevation view of a second explanatory hinge assembly configured in accordance with one or more embodiments of the disclosure in the partially open position.
Figure 14:
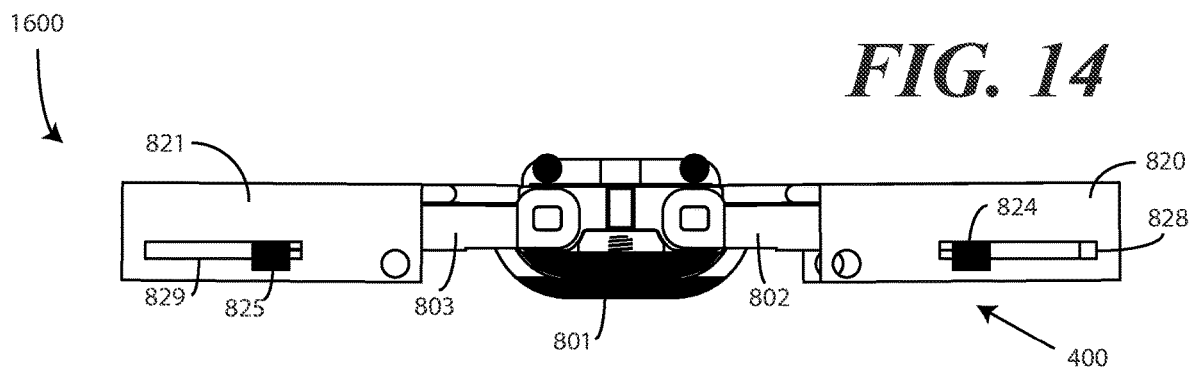
FIG. 14 illustrates a side elevation view of a second explanatory hinge assembly configured in accordance with one or more embodiments of the disclosure in the axially displaced open position.

Turning now to FIGS. 12-14, illustrated therein is a view of the hinge assembly 800 of FIGS. 9-11 when assembled for use in the electronic device (100) of FIGS. 1-5, but without the linking arms (806,807) of FIGS. 9-11 being attached. The views of FIGS. 12-14 illustrate the components of the hinge assembly 800 as they might function when the electronic device (100) transitions between the closed position 200 and the axially displaced open position 400 without the beneficial push-pull operation of the linking arms (806,807).

FIG. 12 illustrates the hinge assembly 800 in the closed position 200, while FIG. 14 illustrates the hinge assembly 800 in the axially displaced open position 400. FIG. 13 illustrates the hinge assembly 800 in a partially open position 300 or "tent" position.

FIG. 14 illustrates that, without any linking arms (806, 807), the first hinge arm 802 and the second hinge arm 803 do not translate relative to the first plate 820 or the second plate 821, despite the fact that the first hinge arm 802 extends to a first distal hinge arm end comprising a first pin 824 captively retained within a translation section of a slot 828 defined by the first plate 820 coupled to the first device housing (102), and the second hinge arm 803 extends to a second distal hinge arm end comprising a second pin 825 captively retained within a translation section of another slot 829 defined by the second plate 821 coupled to the second device housing (103).

As FIG. 14 shows, when the linking arms (806,807) attached between the hinge housing and the first plate 820 and second plate 821, the overall mechanism length in the axially displaced open position 400 will be longer than the flexible display (121). Advantageously, coupling the linking arms (806,807) as shown in FIGS. 9-11, facilitates control of the mechanism length so that, in the axially displaced open position 400, it is the same as the length of the flexible display (121). By comparing FIGS. 12-14, it can be seen that the first pin 824 and the second pin 825 fail to translate within the slots 828,829. This is in contrast to the sliding action occurring in FIGS. 9-11.

Figure 17:
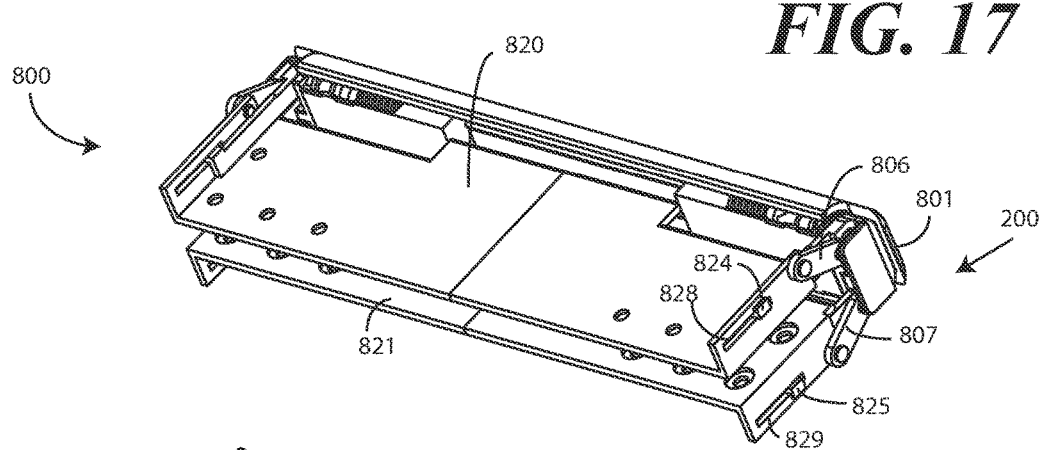
FIG. 17 illustrates yet another perspective view of a first explanatory hinge assembly configured in accordance with one or more embodiments of the disclosure in the closed position.
Figure 18:
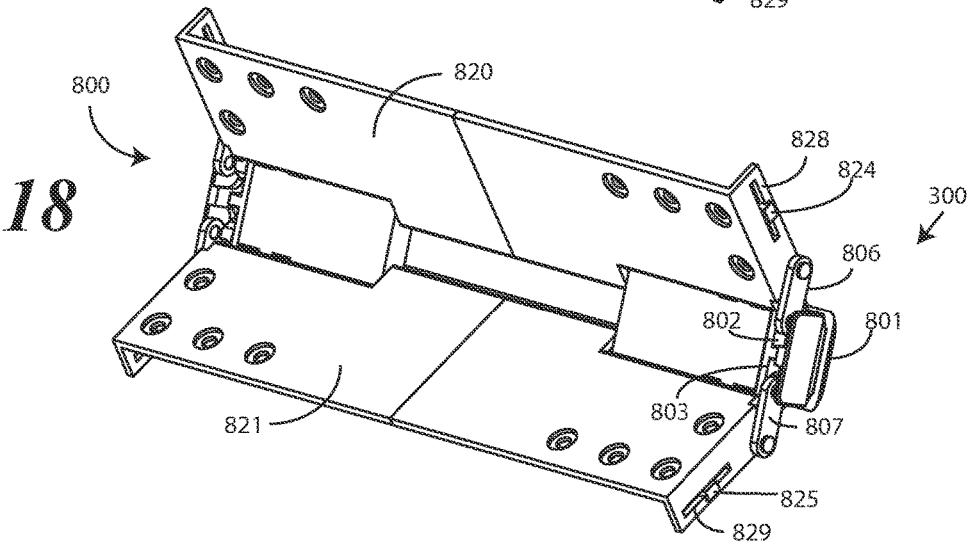
FIG. 18 illustrates yet another perspective view of a first explanatory hinge assembly configured in accordance with one or more embodiments of the disclosure in the partially open position.
Figure 19:
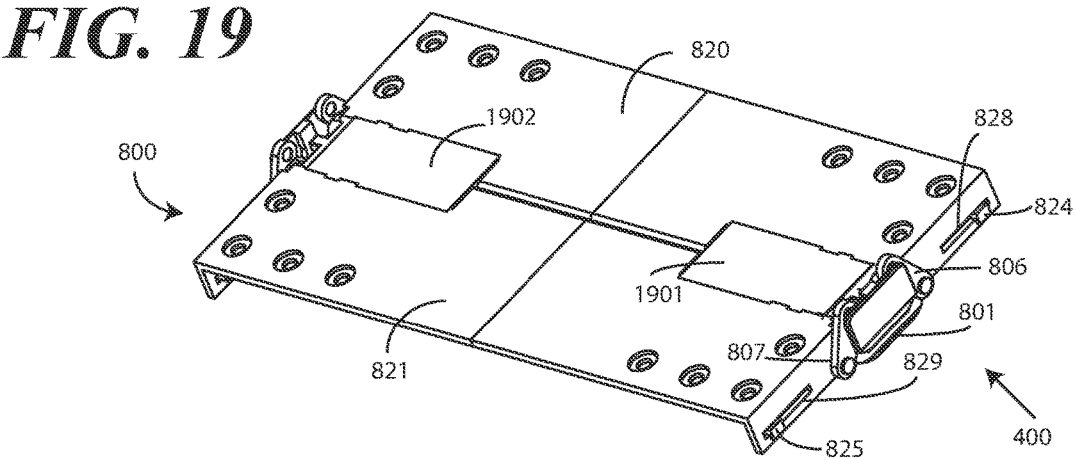
FIG. 19 illustrates yet another perspective view of a first explanatory hinge assembly configured in accordance with one or more embodiments of the disclosure in the axially displaced open position.

Turning now to FIGS. 17-19, illustrated therein are alternate views of the hinge assembly 800 of FIG. 15, with the hinge assembly 800 shown in the closed position 200 in FIG. 17, in the partially open position 300 in FIG. 18, and in the axially displaced open position 400 in FIG. 19. The hinge assembly 800 can be coupled to an electronic device (100) that includes a first device housing (102) and a second device housing (103).

In one or more embodiments, the hinge assembly 800 includes a hinge housing 801 coupled to a first hinge arm 802 extending into to the first device housing (102) to which a first plate 820 is fixedly attached. Similarly, the hinge housing 801 is coupled to a second hinge arm 803 extending into the second device housing. (103) to which a second plate 821 is fixedly attached. In one or more embodiments, the first plate 820 is fixedly attached to the first device housing (102) using one or more screws. The second hinge arm 803 can be fixedly attached to the second device housing (103) in a similar manner.

In one or more embodiments, the first hinge arm 802 comprises a first pin extending from a terminal edge of the first hinge arm 802 and engaging a first slot 828 defined by the first plate 820, which is coupled to the first device housing (102). The second hinge arm 803 comprises a second pin extending from a terminal edge of the second hinge arm 803 and engaging a second slot 829 defined by the second plate 821, which is coupled the second device housing (103).

In one or more embodiments, the first pin translates with the first slot 828 and the second pin translates within the second slot 829, respectively, when the first device housing (102) to which the first plate 820 is coupled and the second device housing (103) to which the second plate 821 is coupled pivot about the hinge housing 801 between the axially displaced open position 400 and the closed position 200. In one or more embodiments, proximal ends of the first plate 820 to which the first device housing (102) is fixedly coupled and the second plate 821 to which the second device housing (103) is fixedly coupled separate a greater distance apart than do distal ends of the first plate 820 to which the first device housing (102) is fixedly coupled and the second plate 821 to which the second device housing (103).

In one or more embodiments, this pivoting action also changes a displacement between the hinge housing 801 and the first device housing (102) and second device housing (103) as previously described. Illustrating by example, due to the action of the linking arms 806,807, in one or more embodiments the displacement is shorter when the first device housing (102) and the second device housing (103) are pivoted about the hinge housing 801 to the axially displaced open position 400 than when the first device housing (102) and second device housing (103) are pivoted about the hinge housing 801 to the closed position 200.

As shown in FIGS. 17-19, in one or more embodiments the hinge assembly 800 further comprises a first linking arm 806 coupled between the hinge housing 801 and the first plate 820. The hinge assembly 800 also includes a second linking arm 807 coupled between the hinge housing 801 and the second plate 821. In one or more embodiments, the first plate 820 is fixedly coupled to the first device housing (102), while the second plate 821 is fixedly coupled to the second device housing (103).

As previously described, the first hinge arm 802 pivots about a first pivot center within the hinge housing 801, while the first linking arm 806 pivots about a second pivot center within the hinge housing 801. The second hinge arm 803 pivots about a third pivot center within the hinge housing 801 while the second linking arm 807 pivots about a fourth pivot center within the hinge housing 801. In the illustrative embodiment of FIGS. 12-14, each the first pivot center, the second pivot center, the third pivot center, and the fourth pivot center are different pivot centers within the hinge housing 801.

In one or more embodiments, the first hinge arm 802 axially pivots about the first pivot center while the first pin translates linearly within the first slot 828. The second hinge arm 803 axially pivots about the third pivot center while the second pin translates linearly within the second translation slot 829. In one or more embodiments, this occurs when the first device housing (102) to which the first plate 820 is fixedly attached and the second device housing (103) to which the second plate 821 is fixedly attached pivot about the hinge housing 801 between the axially displaced open position 400 and the closed position 200, thereby changing the displacement between the hinge housing 801 and the first device housing (102) and second device housing (103).

In one or more embodiments, the first pin extends distally from the first hinge arm 802 to a first pin 824 head captively retaining the first pin within the first slot 828. The second pin extends distally from the second hinge arm 803 to a second pin head captively retaining the second pin within the second slot 829. In one or more embodiments, the first pin and the second pin each define a chamfered rectangular cross section.

In one or more embodiments, the first pin 824 and first pin head define an L-shaped cross section. In one or more embodiments, the second pin 825 and the second pin head also define an L-shaped cross section.

In one or more embodiments, a flexible display (121) is coupled to the first device housing (102) coupled to the first plate 820 and the second device housing (103) coupled to the second plate 821. In one or more embodiments, the flexible display (121) spans the hinge housing 801. In one or more embodiments, a first end of the flexible display (121) is fixedly coupled to the first device housing (102) and a second end of the flexible display (121) is fixedly coupled to the second device housing (103).

As described above, interlocking gears can be coupled to the first hinge arm 802 and the second hinge arm 803. In one or more embodiments, the interlocking gears cause a symmetric angular rotation of the first hinge arm 802 and the second hinge arm 803, respectively, when the first device housing (102) pivots about the hinge housing 801 relative to the second device housing (103).

In one or more embodiments, the first hinge arm 802 and the second hinge arm 803 translate into the first device housing (102) coupled to the first plate 820 and the second device housing (103) coupled to the second plate 821, respectively, when the first device housing (102) coupled to the first plate 820 pivots about the hinge housing 801 from the closed position 200 to the axially displaced open position 400. In one or more embodiments, the first plate 820 and the second plate 821 are pulled toward the hinge housing 801 by the first linking arm 806 and the second linking arm 807 when the hinge assembly 800 is in the axially displaced open position 400. By contrast, the first plate 820 and the second plate 821 are pushed away from the hinge housing 801 by the first linking arm 806 and the second linking arm 807 when the hinge assembly 800 is in the closed position 200. In one or more embodiments, this changes a displacement between the hinge housing 801 and the first device housing (102) coupled to the first plate 820 and the second device housing (103) coupled to the second plate 821.

In one or more embodiments, when the hinge assembly 800 is in the axially displaced open position 400, interior surfaces 1901,1902 of the hinge housing 801, and the first plate 820 and the second plate 821, define a support surface for the flexible display (121) when it spans the hinge mechanism. By contrast, when the hinge assembly is in the closed position 200, the greater separation of the first plate 820 and the second plate 821 at proximal locations to the hinge housing 801 than at distal locations relative to the hinge housing 801 allow the flexible display (121) to define a service loop.

Figure 20:
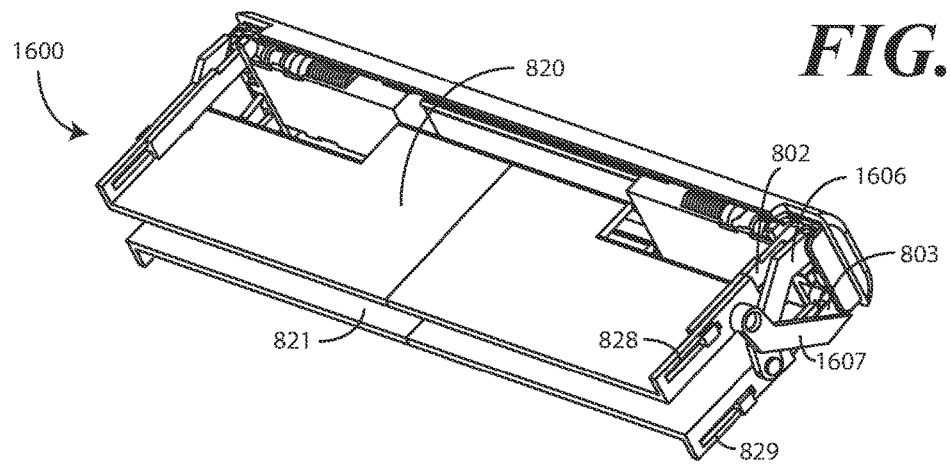
FIG. 20 illustrates yet another perspective view of a second explanatory hinge assembly configured in accordance with one or more embodiments of the disclosure in the closed position.
Figure 21:
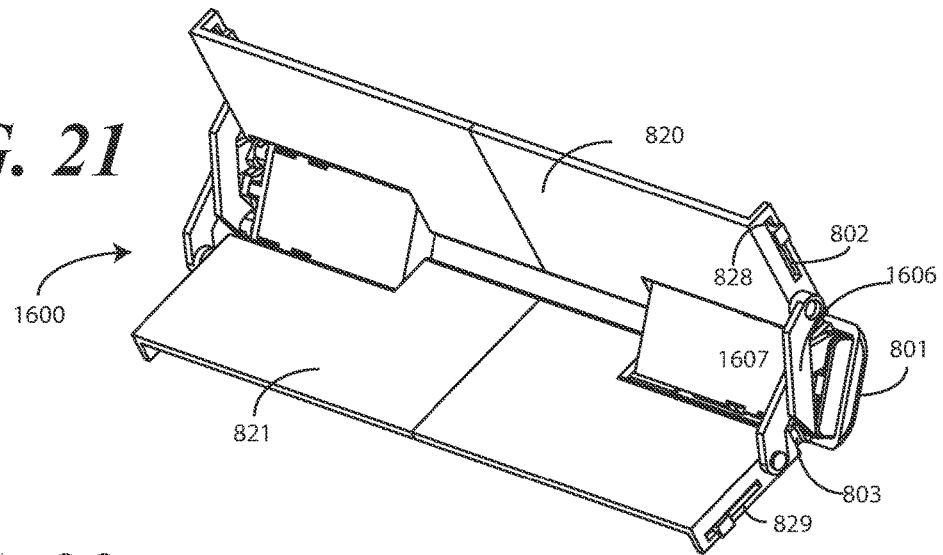
FIG. 21 illustrates yet another perspective view of a second explanatory hinge assembly configured in accordance with one or more embodiments of the disclosure in the partially open position.
Figure 22:
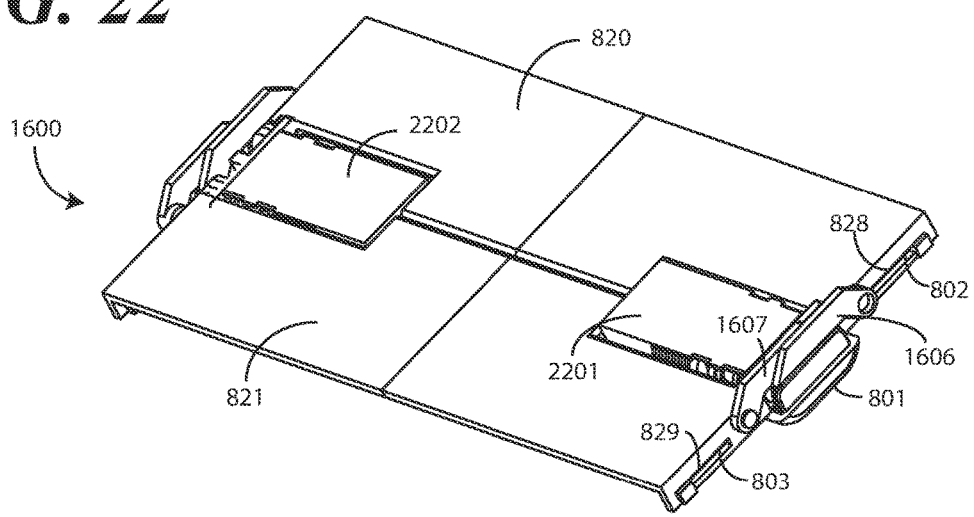
FIG. 22 illustrates yet another perspective view of a second explanatory hinge assembly configured in accordance with one or more embodiments of the disclosure in the axially displaced open position.

Turning now to FIGS. 20-22, illustrated therein are additional views of the hinge assembly 1600 of FIG. 16. This hinge assembly 1600 is also suitable for attachment to an electronic device (100) having a first device housing (102) and a second device housing (103).

In one or more embodiments, the hinge assembly 1600 includes a hinge housing 801 coupled to a first hinge arm 802 extending to a first distal hinge arm end comprising a first pin captively retained within a first slot 828 defined by a first plate 820 fixedly coupled to the first device housing (102). The hinge assembly 1600 also includes a second hinge arm 803 extending to a second distal hinge arm end comprising a second pin captively retained within a second slot 829 defined by a second plate 821 that is fixedly coupled to the second device housing (103). In one or more embodiments, the first pin translates within the first slot 828 and the second pin translates within the second slot 829, respectively, when the first device housing (102) pivots about the hinge housing 801 relative to the second device housing (103) between the axially displaced open position 400 and the closed position 200. In one or more embodiments, this changes a displacement between the hinge housing 801 and the first device housing (102) and second device housing (103). Additionally, this action causes ends of the first device housing (102) and the second device housing (103) proximally situated with the hinge housing 801 to be physically separated from each other when the electronic device (100) is in the closed position 200 due to the fact that the first device housing (102) is fixedly attached to the first plate 820 and the second device housing (103) is fixedly attached to the second plate 821.

When a flexible display (121) has a first end that is fixedly coupled to the first device housing (102), and a second end that is fixedly coupled to the second device housing (103), with the flexible display (121) spanning the hinge housing 801, separation between the ends of the first device housing (102) and the second device housing (103) allow the flexible display (121) to define a service loop when the electronic device (100) is in the closed position 200. In one or more embodiments, the first hinge arm 802 and the second hinge arm 803 translate into the first device housing (102) and the second device housing (103), respectively, when the first device housing (102) pivots about the hinge housing 801 from the closed position 200 to the axially displaced open position 400.

In one or more embodiments, the hinge assembly also comprises a first linking arm 1606 and a second linking arm 1607. In this illustrative embodiment, the first linking arm 1606 is coupled between the hinge housing 801 and the second plate 821, while the second linking arm 1607 is coupled between the hinge housing 801 and the first plate 820.

In one or more embodiments, when the hinge assembly 800 is in the axially displaced open position 400, interior surfaces 2201,2202 of the hinge housing 801, and the first plate 820 and the second plate 821, define a support surface for the flexible display (121) when it spans the hinge mechanism. By contrast, when the hinge assembly 1600 is in the closed position 200, the greater separation of the first plate 820 and the second plate 821 at proximal locations to the hinge housing 801 than at distal locations relative to the hinge housing 801 allow the flexible display (121) to define a service loop.

As mentioned above when describing FIG. 1, not all electronic devices configured in accordance with embodiments of the disclosure employ flexible displays. Accordingly, in other applications it may be desirous to use the hinge mechanisms described above in an electronic device having rigid displays. One such example is shown in FIG. 23.

Figure 23:
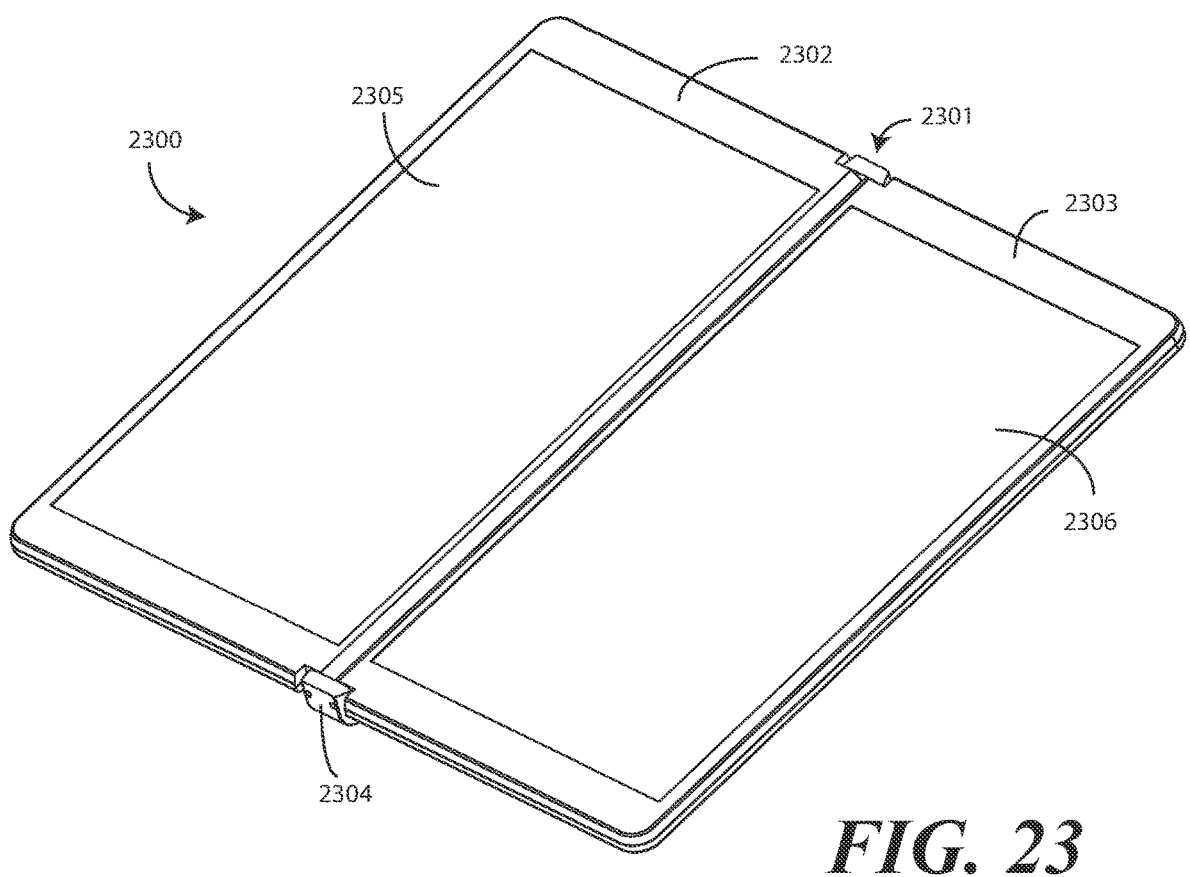
FIG. 23 illustrates an alternate electronic device configured in accordance with one or more embodiments of the disclosure.

Turning now to FIG. 23, illustrated therein is one embodiment where the flexible display and support plates are omitted. As shown in FIG. 23, an electronic device 2300 includes a first device housing 2302 and a second device housing 2303. A hinge 2301, which comprises a hinge body 2304, couples the first device housing 2302 to the second device housing 2303. The first device housing 2302 is pivotable about the hinge 2301 relative to the second device housing 2303 between an axially displaced open position and a closed position, as previously described.

Rather than having a flexible display, in this embodiment the electronic device 2300 includes a first display 2305 coupled to the first device housing 2302 and a second display 2#06 coupled to the second device housing 2303. Thus, in addition to separating the first device housing 2302 from the second device housing 2303, the hinge 2301 separates the first display 2305 from the second display 2306 as well.

Figure 24:
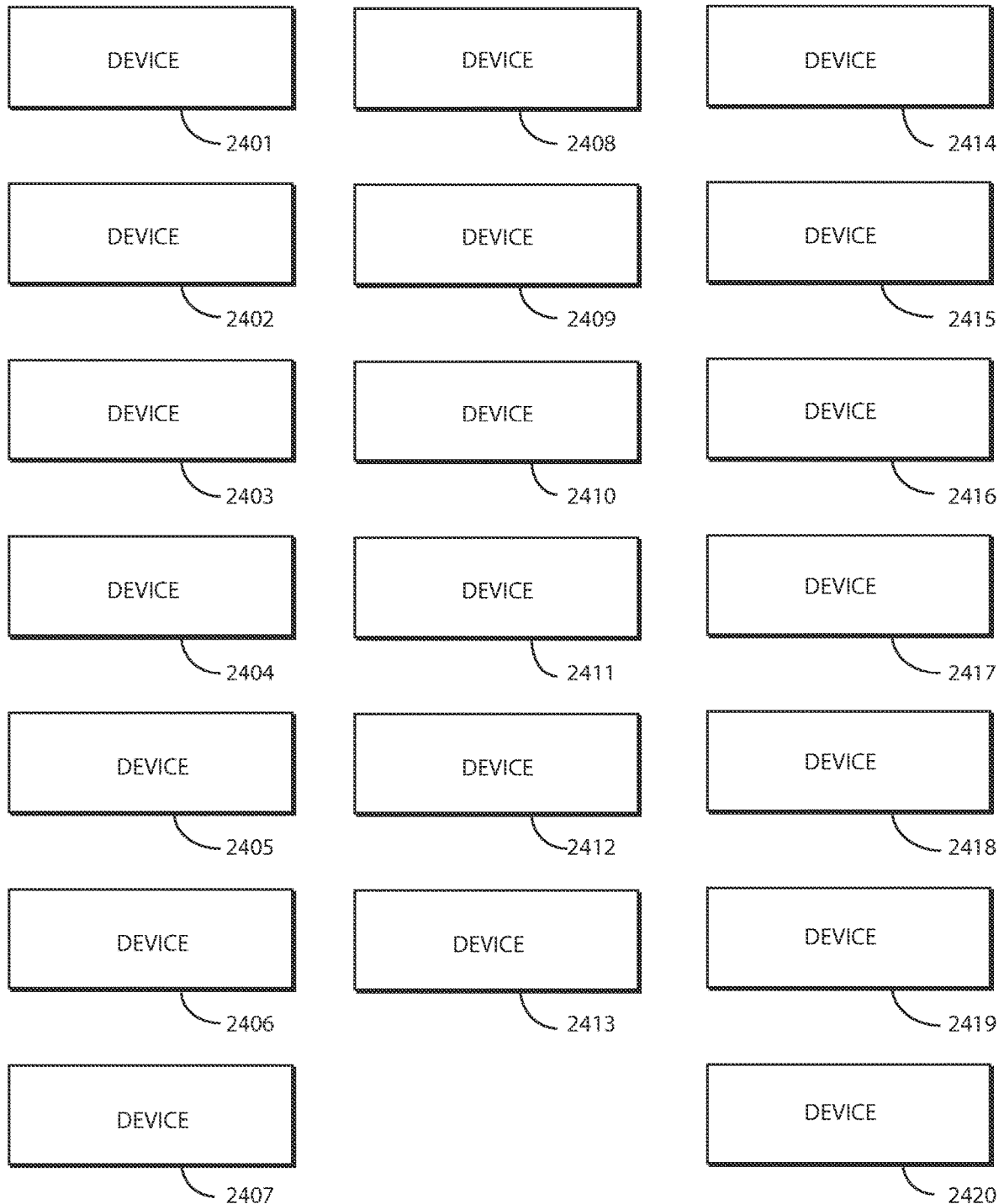
FIG. 24 illustrates various embodiments of the disclosure.

Turning now to FIG. 24, illustrated therein are various embodiments of the disclosure. The embodiments of FIG. 24 are shown as labeled boxes in FIG. 24 due to the fact that the individual components of these embodiments have been illustrated in detail in FIGS. 1-23, which precede FIG. 27. Accordingly, since these items have previously been illustrated and described, their repeated illustration is no longer essential for a proper understanding of these embodiments. Thus, the embodiments are shown as labeled boxes.

At 2401, an electronic device comprises a first device housing and a second device housing. At 2401, the electronic device comprises a hinge housing.

At 2401, the hinge housing is coupled to a first hinge arm extending into to the first device housing. At 2401, the first hinge arm comprises a first pin extending from a terminal edge of the first hinge arm and engaging a first slot defined by a first plate coupled to the first device housing.

At 2401, the hinge housing is coupled to a second hinge arm extending into the second device housing. At 2401, the second hinge arm comprises a second pin extending from a terminal edge of the second hinge arm and engaging a second slot defined by a second plate coupled the second device housing.

At 2401, the first pin translates with the first slot and the second pin translates within the second slot, respectively, when the first device housing and the second device housing pivot about the hinge housing between an axially displaced open position and a closed position. At 2401, this changes a displacement between the hinge housing and the first device housing and second device housing. At 2401, proximal ends of the first device housing and the second device housing coupled to the hinge housing separate a greater distance apart than do distal ends of the first device housing and the second device housing.

At 2402, the displacement of 2401 is shorter when the first device housing and the second device housing are pivoted about the hinge housing to the axially displaced open position than when the first device housing and second device housing are pivoted about the hinge housing to the closed position.

At 2403, the first plate of 2402 is fixedly coupled to the first device housing. At 2403, the second plate of 2402 is fixedly coupled to the second device housing.

At 2404, the electronic device of 2403 further comprises a first linking arm coupled between the hinge housing and the first plate. At 2404, the electronic device comprises a second linking arm coupled between the hinge housing and the second plate.

At 2405, the first hinge arm of 2403 pivots about a first pivot center within the hinge housing. At 2405, the first linking arm pivots about a second pivot center within the hinge housing.

At 2405, the second hinge arm pivots about a third pivot center within the hinge housing.

At 2405, the second linking arm pivots about a fourth pivot center within the hinge housing. At 2405, each the first pivot center, the second pivot center, the third pivot center, and the fourth pivot center are different pivot centers within the hinge housing.

At 2406, the first hinge arm of 2404 axially pivots about the first pivot center while the first pin translates linearly within the first slot. At 2406, the second hinge arm axially pivots about the third pivot center while the second pin translates linearly within the second translation slot. At 2406, these translations occur when the first device housing and the second device housing pivot about the hinge housing between the axially displaced open position and the closed position, thereby changing the displacement between the hinge housing and the first device housing and second device housing.

At 2407, the first pin of 2404 extends distally from the first hinge arm to a first pin head captively retaining the first pin within the first slot. At 2407, the second pin extends distally from the second hinge arm to a second pin head captively retaining the second pin within the second slot.

At 2408, the first pin and the second pin of 2407 each define a chamfered rectangular cross section. At 2409, the first pin and the first pin head of 2408 define an L-shaped cross section.

At 2410, the electronic device of 2401 further comprises a flexible display spanning the hinge housing. At 2410, a first end of the flexible display is fixedly coupled to the first device housing and a second end of the flexible display is fixedly coupled to the second device housing.

At 2411, the electronic device of 2410 further comprises interlocking gears coupled to the first hinge arm and the second hinge arm. At 2411, the interlocking gears cause a symmetric angular rotation of the first hinge arm and the second hinge arm, respectively, when the first device housing pivots about the hinge housing relative to the second device housing.

At 2412, an electronic device comprises a first device housing and a second device housing. At 2412, the electronic device comprises a hinge housing.

At 2412, the hinge housing is coupled to a first hinge arm extending to a first distal hinge arm end comprising a first pin captively retained within a first translation slot defined by a first plate fixedly coupled to the first device housing. At 2412, the hinge housing is coupled to a second hinge arm extending to a second distal hinge arm end comprising a second pin captively retained within a second translation slot defined by a second plate fixedly coupled to the second device housing.

At 2412, The first pin translates within the first translation slot and the second pin translates within the second translation slot, respectively, when the first device housing pivots about the hinge housing relative to the second device housing between an axially displaced open position and a closed position. At 2412, this translation changes a displacement between the hinge housing and the first device housing and second device housing. At 2412, ends of the first device housing and the second device housing proximally situated with the hinge housing are physically separated from each other when the electronic device is in the closed position.

At 2413, the electronic device of 2412 further comprises a flexible display spanning the hinge housing. At 2413, a first end of the flexible display is fixedly coupled to the first device housing and a second end of the flexible display is fixedly coupled to the second device housing. At 2413, separation between the ends of the first device housing and the second device housing allow the flexible display to define a service loop when the electronic device is in the closed position.

At 2414, the displacement of 2413 is shorter when the first device housing and the second device housing are pivoted about the hinge housing to the axially displaced open position than when the first device housing and second device housing are pivoted about the hinge housing to the closed position. At 2415, the first hinge arm and the second hinge arm of 2414 translate into the first device housing and the second device housing, respectively, when the first device housing pivots about the hinge housing from the closed position to the axially displaced open position. At 2416, the electronic device of 2415 further comprises a first linking arm coupled between the hinge housing and the first plate and a second linking arm coupled between the hinge housing and the second plate.

At 2417, an electronic device comprises a first device housing and a second device housing. At 2417, the electronic device comprises a hinge housing.

At 2417, the electronic device comprises a first linking arm coupled between a first pivot center within the hinge housing and a first plate of the first device housing. At 2417, the electronic device comprises a second linking arm coupled to a second pivot center within the hinge housing and a second plate of the second device housing.

At 2417, the electronic device comprises a first hinge arm pivotally coupled about a third pivot center within the hinge housing. At 2417, the first hinge arm extends into the first device housing to a first hinge arm distal end having a first hinge arm pin situated within a first translation slot defined by the first plate.

At 2417, the electronic device comprises a second hinge arm pivotally coupled about a fourth pivot center within the hinge housing. At 2417, the second hinge arm extends into the second device housing to a second hinge arm distal end having a second hinge arm pin situated within a second translation slot defined by the second plate.

At 2417, the first hinge arm axially pivots about the third pivot center while the first hinge arm pin translates linearly within the first translation slot. At 2417, the second hinge arm axially pivots about the fourth pivot center while the second hinge arm pin translates linearly within the second translation slot. At 2417, this translation occurs when the first device housing and the second device housing pivot about the hinge housing between an axially displaced open position and a closed position. At 2417, this translation changes a displacement between the hinge housing and the first device housing and second device housing.

At 2418, the displacement of 2417 is shorter when the first device housing and the second device housing are pivoted about the hinge housing to the axially displaced open position than when the first device housing and second device housing are pivoted about the hinge housing to the closed position. At 2419, ends of the first device housing and the second device housing of 2417 that are proximally located with the hinge housing are separated when the electronic device is in the closed position.

At 2420, the electronic device of 2419 further comprises a flexible display spanning the hinge housing. At 2420, a first end of the flexible display is fixedly coupled to the first device housing and a second end of the flexible display is fixedly coupled to the second device housing. At 2420, separation between the ends of the first device housing and the second device housing allow the flexible display to define a service loop when the electronic device is in the closed position.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
a first device housing and a second device housing; and
a hinge housing coupled to:
  a first hinge arm extending into to the first device housing, the first hinge arm comprising a first pin extending from a terminal edge of the first hinge arm and engaging a first slot defined by a first plate coupled to the first device housing; and
  a second hinge arm extending into the second device housing, the second hinge arm comprising a second pin extending from a terminal edge of the second hinge arm and engaging a second slot defined by a second plate coupled the second device housing;
wherein:
  the first pin translates with the first slot and the second pin translates within the second slot, respectively, when the first device housing and the second device housing pivot about the hinge housing between an axially displaced open position and a closed position, thereby changing a displacement between the hinge housing and the first device housing and second device housing; and
  proximal ends of the first device housing and the second device housing coupled to the hinge housing separate a greater distance apart than do distal ends of the first device housing and the second device housing;
  further comprising a first linking arm coupled between the hinge housing and the first plate and a second linking arm coupled between the hinge housing and the second plate.

2. The electronic device of claim 1, wherein the displacement is shorter when the first device housing and the second device housing are pivoted about the hinge housing to the axially displaced open position than when the first device housing and second device housing are pivoted about the hinge housing to the closed position.

3. The electronic device of claim 2, wherein the first plate is fixedly coupled to the first device housing and the second plate is fixedly coupled to the second device housing.

4. The electronic device of claim 1, further comprising a flexible display spanning the hinge housing.

5. The electronic device of claim 3, wherein:
the first hinge arm pivots about a first pivot center within the hinge housing;
the first linking arm pivots about a second pivot center within the hinge housing;
the second hinge arm pivots about a third pivot center within the hinge housing; and
the second linking arm pivots about a fourth pivot center within the hinge housing;
wherein each the first pivot center, the second pivot center, the third pivot center, and the fourth pivot center are different pivot centers within the hinge housing.

6. The electronic device of claim 4, wherein:
the first hinge arm axially pivots about a first pivot center while the first pin translates linearly within the first slot and the second hinge arm axially pivots about a third pivot center while the second pin translates linearly within the second translation slot, respectively, when the first device housing and the second device housing pivot about the hinge housing between the axially displaced open position and the closed position, thereby changing the displacement between the hinge housing and the first device housing and second device housing.

7. The electronic device of claim 4, wherein:
the first pin extends distally from the first hinge arm to a first pin head captively retaining the first pin within the first slot; and
the second pin extends distally from the second hinge arm to a second pin head captively retaining the second pin within the second slot.

8. The electronic device of claim 7, wherein the first pin and the second pin each define a chamfered rectangular cross section.

9. The electronic device of claim 8, wherein the first pin and first pin head define an L-shaped cross section.

10. The electronic device of claim 1, further comprising a flexible display spanning the hinge housing, wherein a first end of the flexible display fixedly coupled to the first device housing and a second end of the flexible display fixedly coupled to the second device housing.

11. The electronic device of claim 10, further comprising interlocking gears coupled to the first hinge arm and the second hinge arm, wherein the interlocking gears cause a symmetric angular rotation of the first hinge arm and the second hinge arm, respectively, when the first device housing pivots about the hinge housing relative to the second device housing.

12. An electronic device, comprising:
a first device housing and a second device housing; and
a hinge housing coupled to a first hinge arm extending to a first distal hinge arm end comprising a first pin captively retained within a first translation slot defined by a first plate fixedly coupled to the first device housing and a second hinge arm extending to a second distal hinge arm end comprising a second pin captively retained within a second translation slot defined by a second plate fixedly coupled to the second device housing such that the first pin translates within the first translation slot and the second pin translates within the second translation slot, respectively, when the first device housing pivots about the hinge housing relative to the second device housing between an axially displaced open position and a closed position, thereby changing a displacement between the hinge housing and the first device housing and second device housing, and ends of the first device housing and the second device housing proximally situated with the hinge housing are physically separated from each other when the electronic device is in the closed position;

further comprising a first linking arm coupled between the hinge housing and the first plate and a second linking arm coupled between the hinge housing and the second plate.

13. The electronic device of claim 12, further comprising a flexible display spanning the hinge housing, wherein a first end of the flexible display fixedly coupled to the first device housing and a second end of the flexible display fixedly coupled to the second device housing, wherein separation between the ends of the first device housing and the second device housing allow the flexible display to define a service loop when the electronic device is in the closed position.

14. The electronic device of claim 13, wherein the displacement is shorter when the first device housing and the second device housing are pivoted about the hinge housing to the axially displaced open position than when the first device housing and second device housing are pivoted about the hinge housing to the closed position.

15. The electronic device of claim 14, wherein the first hinge arm and the second hinge arm translate into the first device housing and the second device housing, respectively, when the first device housing pivots about the hinge housing from the closed position to the axially displaced open position.

16. The electronic device of claim 12, the first hinge arm and the second hinge arm causing the first device housing and the second device housing to rotate symmetrically about the hinge housing between the axially displaced open position and the closed position.

17. An electronic device, comprising:
   a first device housing and a second device housing;
   a hinge housing;
   a first linking arm coupled between a first pivot center within the hinge housing and a first plate of the first device housing;
   a second linking arm coupled to a second pivot center within the hinge housing and a second plate of the second device housing;
   a first hinge arm pivotally coupled about a third pivot center within the hinge housing, the first hinge arm extending into the first device housing to a first hinge arm distal end having a first hinge arm pin situated within a first translation slot defined by the first plate; and
   a second hinge arm pivotally coupled about a fourth pivot center within the hinge housing and extending into the second device housing to a second hinge arm distal end having a second hinge arm pin situated within a second translation slot defined by the second plate;
   wherein the first hinge arm axially pivots about the third pivot center while the first hinge arm pin translates linearly within the first translation slot and the second hinge arm axially pivots about the fourth pivot center while the second hinge arm pin translates linearly within the second translation slot, respectively, when the first device housing and the second device housing pivot about the hinge housing between an axially displaced open position and a closed position, thereby changing a displacement between the hinge housing and the first device housing and second device housing.

18. The electronic device of claim 17, wherein the displacement is shorter when the first device housing and the second device housing are pivoted about the hinge housing to the axially displaced open position than when the first device housing and second device housing are pivoted about the hinge housing to the closed position.

19. The electronic device of claim 17, wherein ends of the first device housing and the second device housing proximally located with the hinge housing are separated when the electronic device is in the closed position.

20. The electronic device of claim 19, further comprising a flexible display spanning the hinge housing, wherein a first end of the flexible display fixedly coupled to the first device housing and a second end of the flexible display fixedly coupled to the second device housing, wherein separation between the ends of the first device housing and the second device housing allow the flexible display to define a service loop when the electronic device is in the closed position.

* * * * *